US011965365B2

(12) United States Patent
Komkin et al.

(10) Patent No.: US 11,965,365 B2
(45) Date of Patent: Apr. 23, 2024

(54) VEHICLE LOCK WITH PULL-IN DEVICE AND VEHICLE WITH SUCH A VEHICLE LOCK

(71) Applicant: D. LA PORTE SÖHNE GMBH, Wuppertal (DE)

(72) Inventors: Viktor Komkin, Wuppertal (DE); Bastian La Porte, Wuppertal (DE)

(73) Assignee: D. LA PORTE SÖHNE GMBH, Wuppertal (DE)

( * ) Notice: Subject to any disclaimer, the term of this patent is extended or adjusted under 35 U.S.C. 154(b) by 133 days.

(21) Appl. No.: 17/391,941

(22) Filed: Aug. 2, 2021

(65) Prior Publication Data

US 2022/0042353 A1 Feb. 10, 2022

(30) Foreign Application Priority Data

Aug. 7, 2020 (DE) ..................... 10 2020 210 067.5

(51) Int. Cl.
*E05B 81/38* (2014.01)
*E05B 81/06* (2014.01)
*E05B 81/14* (2014.01)
*E05B 81/56* (2014.01)
*E05B 81/66* (2014.01)
*E05B 85/26* (2014.01)

(52) U.S. Cl.
CPC .............. *E05B 81/38* (2013.01); *E05B 81/06* (2013.01); *E05B 81/14* (2013.01); *E05B 81/56* (2013.01); *E05B 81/66* (2013.01); *E05B 85/26* (2013.01); *E05Y 2900/518* (2013.01)

(58) Field of Classification Search
CPC .......... E05B 81/38; E05B 81/06; E05B 81/14; E05B 81/56; E05B 81/66; E05B 85/26; E05Y 2900/518
USPC .......................................................... 292/201
See application file for complete search history.

(56) References Cited

U.S. PATENT DOCUMENTS

| | | | | |
|---|---|---|---|---|
| 5,639,130 | A * | 6/1997 | Rogers, Jr. | E05B 81/20 292/201 |
| 6,158,787 | A | 12/2000 | Kutschat | |
| 6,550,825 | B2 * | 4/2003 | Ostrowski | E05B 81/20 292/201 |
| 6,730,867 | B2 * | 5/2004 | Hyp | E05B 81/20 200/50.01 |
| 9,284,768 | B2 | 3/2016 | Sasaki | |
| 2006/0219497 | A1 * | 10/2006 | Organek | F16D 65/186 188/161 |
| 2014/0373454 | A1 * | 12/2014 | Sasaki | E05F 15/63 49/350 |
| 2016/0251879 | A1 | 9/2016 | Behnke | |

(Continued)

FOREIGN PATENT DOCUMENTS

| | | | |
|---|---|---|---|
| DE | 19653169 | A1 | 6/1998 |
| DE | 10 2013 012 117 | A1 | 1/2015 |
| EP | 0 109 656 | A2 | 5/1984 |

*Primary Examiner* — Kristina R Fulton
*Assistant Examiner* — James Edward Ignaczewski
(74) *Attorney, Agent, or Firm* — DICKINSON WRIGHT PLLC

(57) ABSTRACT

The invention relates to a vehicle lock (1) including a rotary latch assembly (2) and a closing device (3) for the locking and closing of doors or hatches of motor vehicles, in particular of doors or hatches of agricultural machines, such as, for example, tractors, or of construction machines, as well as a vehicle including such a vehicle lock (1).

29 Claims, 23 Drawing Sheets

(56) References Cited

U.S. PATENT DOCUMENTS

| | | | | |
|---|---|---|---|---|
| 2017/0044815 | A1* | 2/2017 | Watanabe ............... | E05F 15/63 |
| 2018/0258671 | A1* | 9/2018 | Graute .................... | E05B 81/50 |

* cited by examiner

VEHICLE LOCK WITH PULL-IN DEVICE AND VEHICLE WITH SUCH A VEHICLE LOCK

CROSS-REFERENCE TO RELATED APPLICATIONS

This application claims the benefit of priority under 35 U.S.C. § 119 to German Patent Application No. 10 2020 210 067.5, filed Aug. 7, 2020, the contents of which are incorporated herein by reference in their entirety.

FIELD OF THE INVENTION

The invention relates to a vehicle lock including a rotary latch assembly for the locking and closing of doors or hatches of motor vehicles, in particular of doors or hatches of agricultural machines, such as, for example, tractors or construction machines, as well as a vehicle including such a vehicle lock.

BACKGROUND

Such a door lock is known, for example, from DE 196 53 169 A1. This door lock includes a rotary latch assembly including a lock case, wherein two rotary latches are rotatably supported. The rotary latches serve for receiving a locking bolt and comprise a pre-latching position or safety-latching position, in which n the lock or door is not yet completely closed, as well as main- or final-latching position, in which the lock or the door is completely closed. A locking pawl is available for locking the rotary latches in the pre-latching position or final-latching position. The known door lock has proven its worth.

From the automobile field, locks are known that include a closing device by which the lock is automatically brought from its safety-latching position into its completely closed final-latching position, without the operator having to pull the vehicle door further. This is effected, for example, by driving the locking bolt or the lock.

In addition, from DE 10 2013 012 117 A1, a vehicle lock is known for locking doors or hatches of motor vehicles, in particular of doors or hatches of agricultural machines, such as, for example, tractors or construction machines. The vehicle lock includes a rotary latch assembly including two rotatably supported rotary latches for grasping and retaining a locking bolt in a pre-latching position or a final-latching position, and a locking pawl for locking the two rotary latches in their pre-latching position or final-latching position. In addition, the vehicle lock includes a closing device, to which the rotary latches are each connected, in a rotatably drivable manner in a rotary-latch-closing direction from the pre-latching position into the final-latching position. For this purpose a drive lever and a closing lever connected thereto are present. The drive lever is also rotatably drivable by a drive motor from a non-actuated into an actuated position.

This vehicle lock including the closing device has proven its worth.

SUMMARY

The object of the present invention is the providing of a vehicle lock including a rotary latch assembly for the locking and closing of doors or hatches of motor vehicles, in particular of doors or hatches of agricultural machines, such as, for example, tractors or combine harvesters, or construction machines that include a closing device wherein the vehicle lock is always to be able to be opened manually. Furthermore, the normal locking function of the lock is not to be impaired by the closing device. In particular, even in the event of failure of the closing device, the locking function of the lock is not to be impaired.

This object is achieved by a vehicle lock according to example embodiments described herein.

BRIEF DESCRIPTION OF THE DRAWINGS

In the following the invention is described in more detail with reference to drawings.

Figure 1:
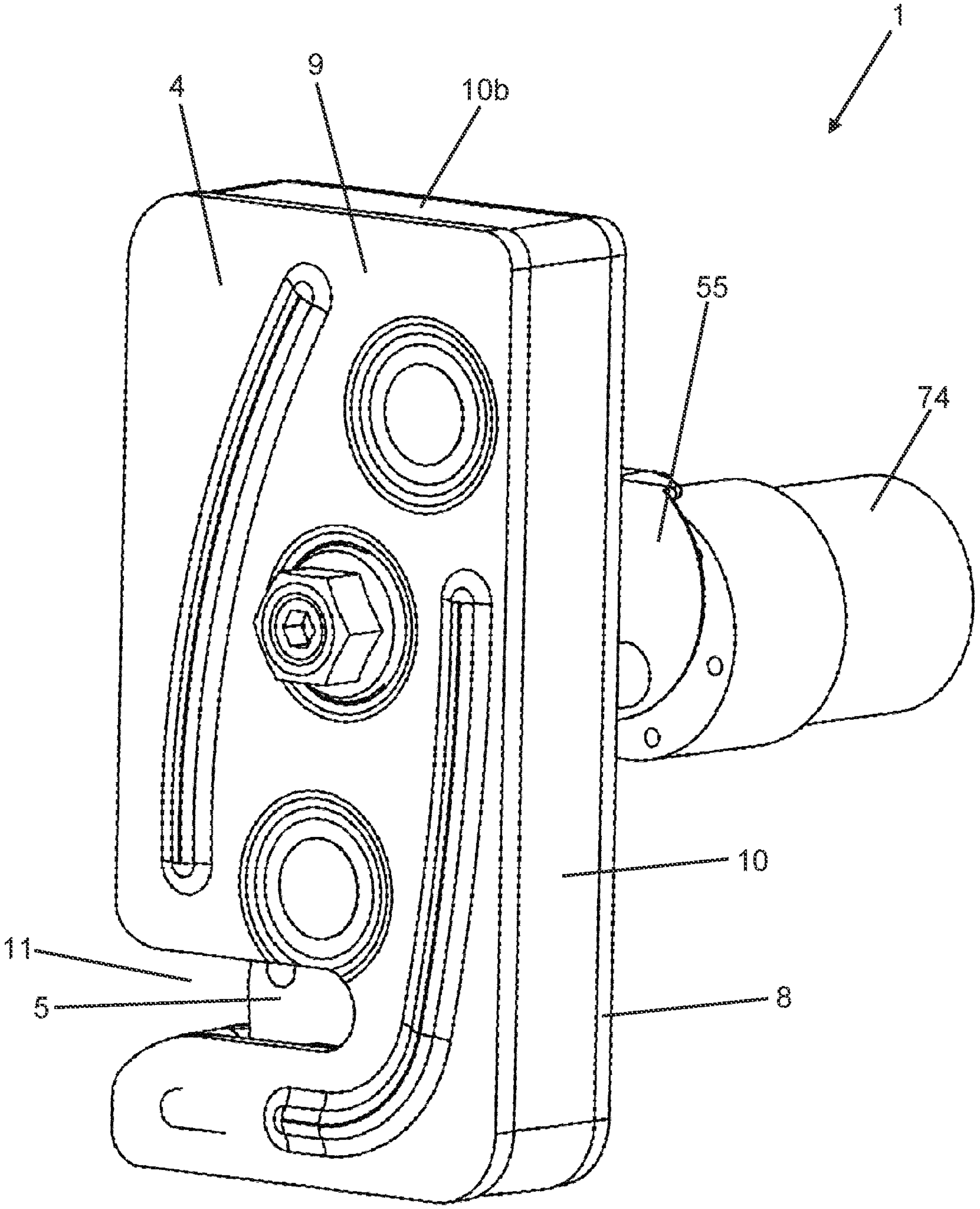
FIG. 1 shows a perspective view of an inventive vehicle lock.
Figure 2:
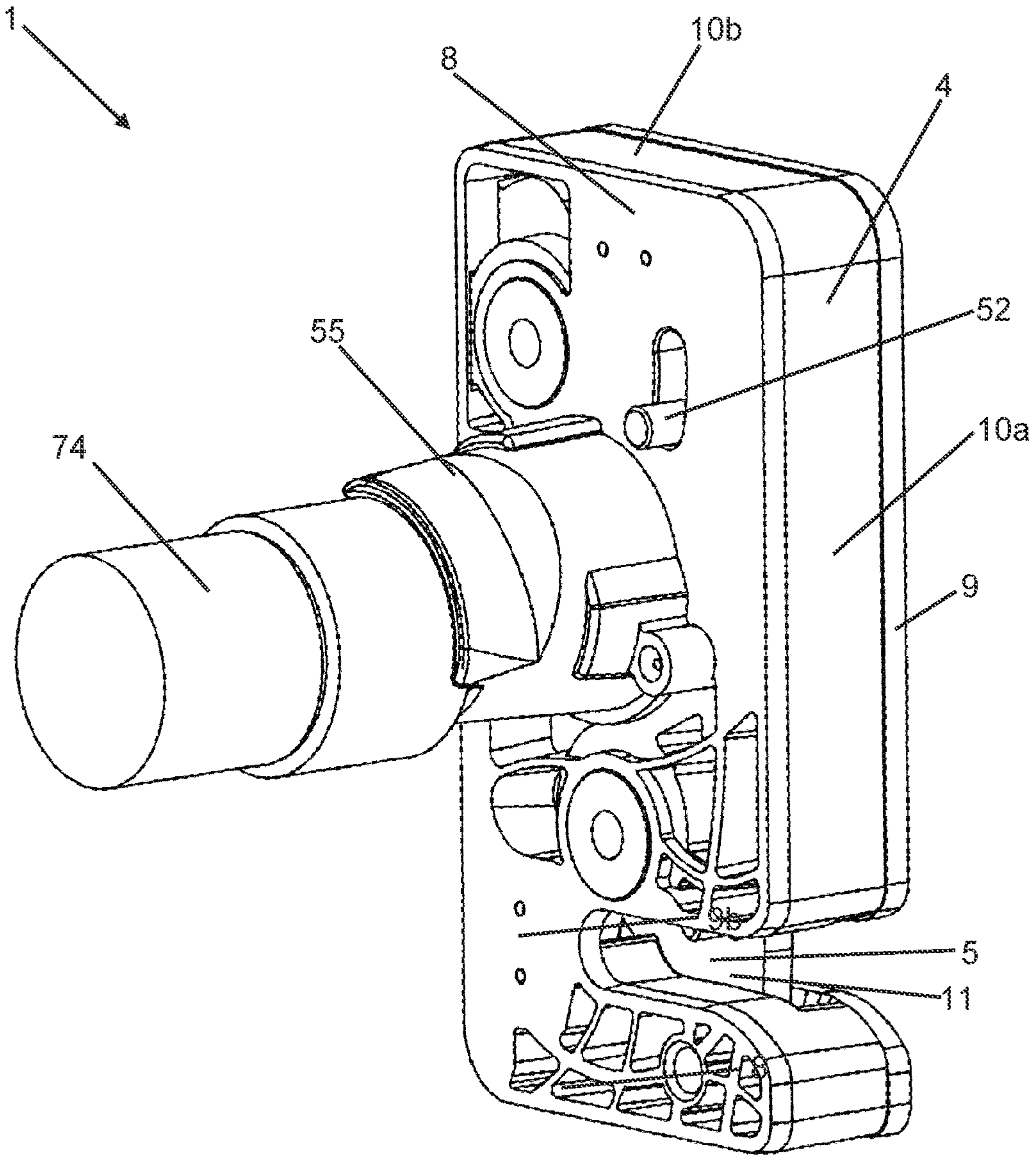
FIG. 2 shows a further perspective, motor-side view of an inventive vehicle lock.
Figure 3:
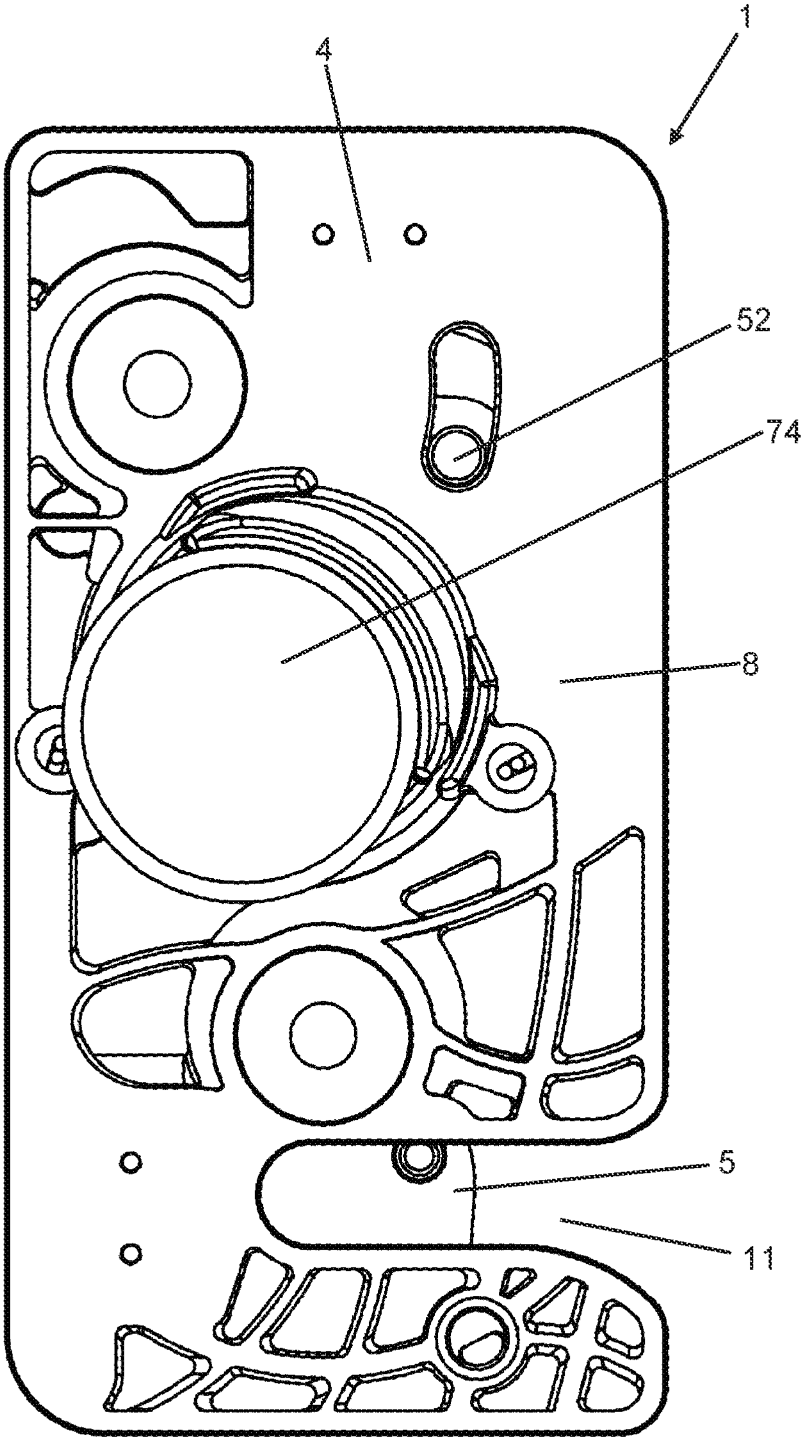
FIG. 3 shows a motor-side, rear-side plan view of the inventive vehicle lock.

The inventive vehicle lock 1 includes a rotary latch assembly 2 and a closing device 3.

DETAILED DESCRIPTION

The rotary latch assembly 2 includes a lock case 4, a single rotary latch 5 disposed therein, a drive wheel 6, and a drive-wheel locking pawl or locking pawl 7. It is thus a single-rotary-latch assembly including only one single rotary latch 5. The cuboid lock case 4 serves for supporting the rotary latch 5, the drive wheel 6, and the locking pawl 7. For this purpose the lock case 4 preferably includes a back wall 8, an in particular plate-shaped cover or a cover wall 9 opposing the rear wall 8 and parallel thereto, two longitudinal walls 10*a* that are parallel to each other and perpendicular to the rear wall 8, and two transverse or side walls 10*b* that are parallel to each other and perpendicular to the longitudinal walls 10*b* (FIG. 1-6). The lock case 4 is preferably composed of plastic.

In addition, a known groove-shaped locking-bolt recess 11, extending continuously through the rear wall 8, the cover 9, and the one longitudinal wall 10*a*, is introduced in the lock case 4; the locking-bolt recess 11 provides space for the receiving of a locking-bolt 12, which is discussed in more detail below. The locking-bolt recess 11 extends from the longitudinal wall 10*a* into the rear wall 8 and the cover 9, and opens into an expediently round, preferably circular, recess base. The locking bolt 12 is usually connected to the vehicle body in a fixed manner (not depicted). And the rotary latch assembly 2 is usually connected in a fixed manner to the vehicle-door or -hatch.

The rotary latch 5 is disposed inside the lock case 4. It is supported about a rotary-latch rotational axis 5*a*, preferably on a rotary-latch supporting bolt 13. The rotary-latch supporting bolt 13 is expediently connected in a fixed manner to the cover 9. The rotary-latch rotational axis 5*a* is preferably perpendicular to the cover 9. As a result, the rotary latch 5 is connected to the lock case 4, preferably the cover 9, rotatably about the rotary-latch rotational axis 5*a*, and otherwise unrotatably and undisplaceably connected to the lock case 4.

The rotary latch 5 is formed plate-shaped in a known manner, for example, from steel, and extends parallel to the cover 9 and slightly spaced therefrom.

In a known manner the rotary latch 5 also includes a latch lug 14 and a groove-shaped locking-bolt receptacle 15 for receiving the locking bolt 12. In particular viewed in a rotary-latch closing direction 16*a*, the locking-bolt receptacle 15 follows the latch lug 14.

The rotary latch 5 also includes two opposing rotary-latch top sides 17 and a rotary-latch circumferential wall 18. In addition, the rotary latch 5 includes an actuating lug 19. Viewed in rotary-latch closing direction 16*a*, the actuating lug 19 follows the locking-bolt receptacle 15. Or the locking-bolt receptacle 15 is disposed between the actuating lug 19 and the latch lug 14.

Furthermore, the rotary latch 5, preferably the rotary-latch circumferential wall 18, includes a rotary-latch toothing 20. The rotary-latch toothing 20 includes a plurality of, preferably four, rotary-latch teeth 21 mutually adjacent in the circumferential direction. The rotary-latch toothing 20 is preferably disposed radially opposite to the locking-bolt receptacle 15.

In addition, the rotary latch 5 includes a mandrel 22 that protrudes from the rotary-latch top side 17 facing the rear wall 8. The mandrel 22 serves as signal generator for a first sensor 104 associated with the rotary latch 5, which is discussed in more detail below. In addition, the mandrel 22 is preferably disposed in the region of the actuating lug 19.

Furthermore, the rotary-latch assembly 2 includes a rotary-latch spring 23. The rotary-latch spring 23 is connected to the rotary latch 5 and drives it in a rotary-latch opening direction 16*b* opposite to the rotary-latch closing direction 16*a*. The rotary latch 5 is thus drivably connected to the rotary-latch spring 23, preferably directly, in rotary-latch opening direction 16*b* about the rotary-latch rotational axis 5*a*. The rotary latch spring 23 thus has the aim of holding the rotary latch 5 in the opened position. Thereby the rotary-latch spring 23 is supported on one end directly against the rotary latch 5, and on the other end against the lock case 4.

As explained above, the rotary-latch assembly 2 also includes the drive wheel 6.

The drive wheel 6 is also disposed inside the lock case 4. It is rotatably supported about a drive-wheel rotational axis 6*a*, preferably on a drive-wheel supporting bolt 24. Thereby the drive-wheel rotational axis 6*a* is preferably parallel to the rotary-latch rotational axis 5*a* and spaced therefrom. The drive-wheel supporting bolt 24 is expediently connected in a fixed manner to the cover 9, in particular screwed. As a result, the drive wheel 6 is connected to the cover 9 rotatably about the drive-wheel rotational axis 6*a*, and otherwise unrotatably and undisplaceably connected to the cover 9. Furthermore, an axial deep groove ball bearing 109 (FIG. 23) is preferably supported in the drive-wheel supporting bolt 24. In a known manner the axial deep groove ball bearing 109 includes two bearing housing discs 111 rotatably connected to each other via a ball and cage assembly 110. One of the two bearing housing discs 111 is fixed in the drive-wheel supporting bolt 24.

The drive wheel 6 is also preferably formed plate-shaped, for example, from steel, and extends parallel to the cover 9 and spaced therefrom. In addition, the drive wheel 6 is disposed parallel to the rotary latch 5, and on the same plane as it.

The drive wheel 6 also includes two opposing drive-wheel top sides 25, and a drive-wheel circumferential wall 26 encircling in the circumferential direction.

In addition, the drive wheel 6, in particular the drive-wheel circumferential wall 26, includes a drive-wheel detent lug 27, as well as a first and a second drive-wheel detent recess 28*a;b*. Viewed in the circumferential direction of the drive wheel 6, the two drive-wheel detent recesses 28*a;b* are disposed on both sides of the drive-wheel detent lug 27.

Furthermore, the drive wheel 6, preferably the drive-wheel circumferential wall 26, includes a drive-wheel toothing 29. The drive-wheel toothing 29 includes a plurality of, preferably three, drive wheel teeth 30 mutually adjacent in the circumferential direction. The drive-wheel toothing 29 also engages into the rotary-latch toothing 20 or interacts with it and is therefore configured corresponding to it.

Since the two toothing 20;29 engage in each other, the rotary latch 5, driven by the rotary latch spring 23, drives the drive wheel 6 in a drive-wheel opening direction 31*b*. Here the drive-wheel opening direction 31*b* is opposite to the rotary-latch opening direction 16*b*. The same applies for a drive-wheel closing direction 31*a* and the rotary-latch closing direction 16*a*.

The drive wheel 6 is thus connected to the rotary-latch spring 23, preferably via the rotary latch 5, drivably about the drive-wheel rotational axis 6*a*, in drive-wheel opening direction 31*b*. A dedicated drive-wheel spring for the drive wheel 6 is preferably not present. However, this can be the case.

In addition, the drive wheel 6 includes a plurality of, preferably three, driving pins 32 that protrude from the drive-wheel top side 25 facing away from the cover 9. The driving pins 32 serve for a torque transmitting connection of the drive wheel 6 to the closing device 3, which is discussed in more detail below. Viewed in the circumferential direction of the drive wheel 6, the driving pins 32 are preferably disposed adjacent to one another.

Figure 9:
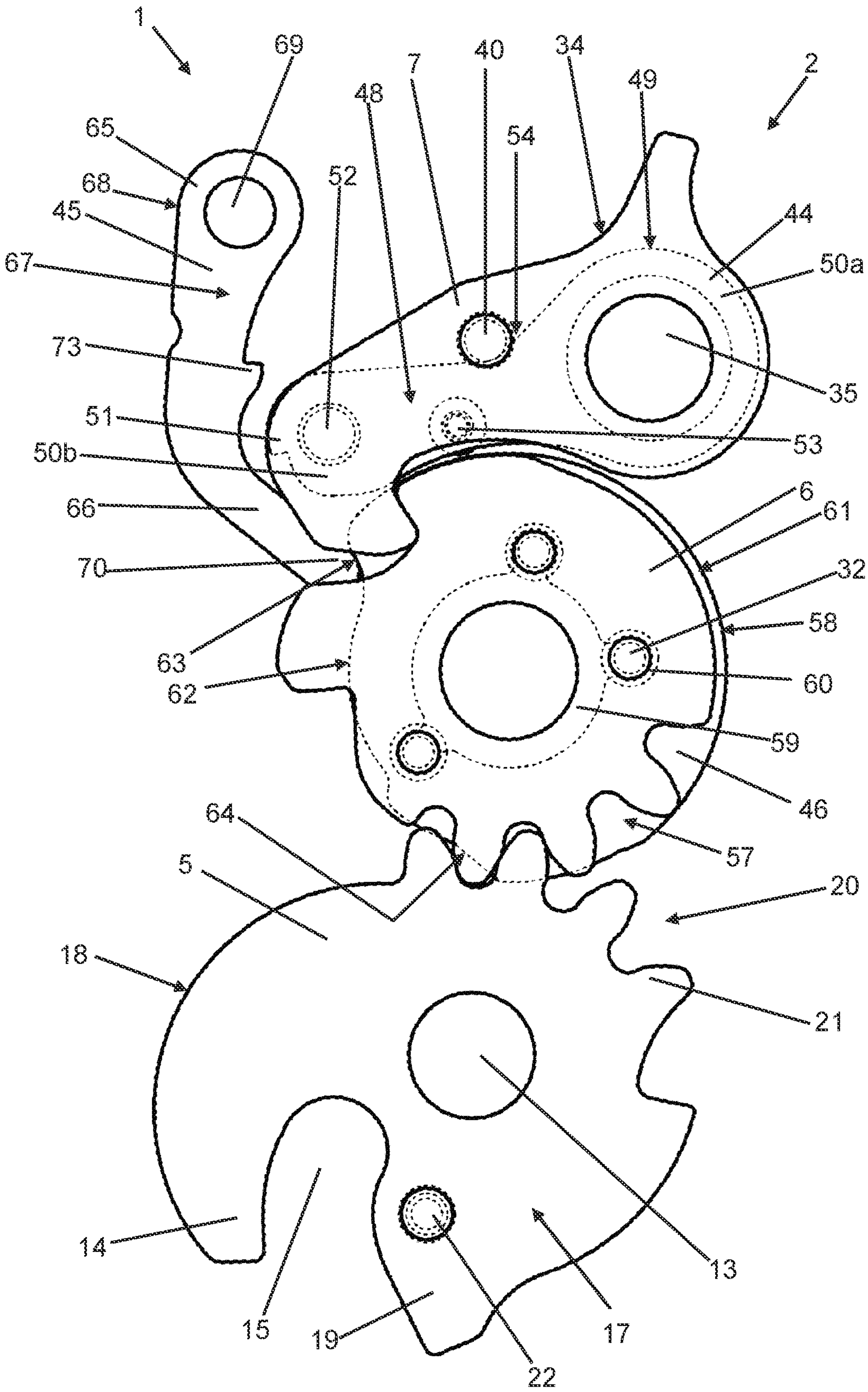
FIG. 9 shows a front-side plan view according to FIG. 8 in safety-latching or pre-latching position of the vehicle lock.
Figure 10:
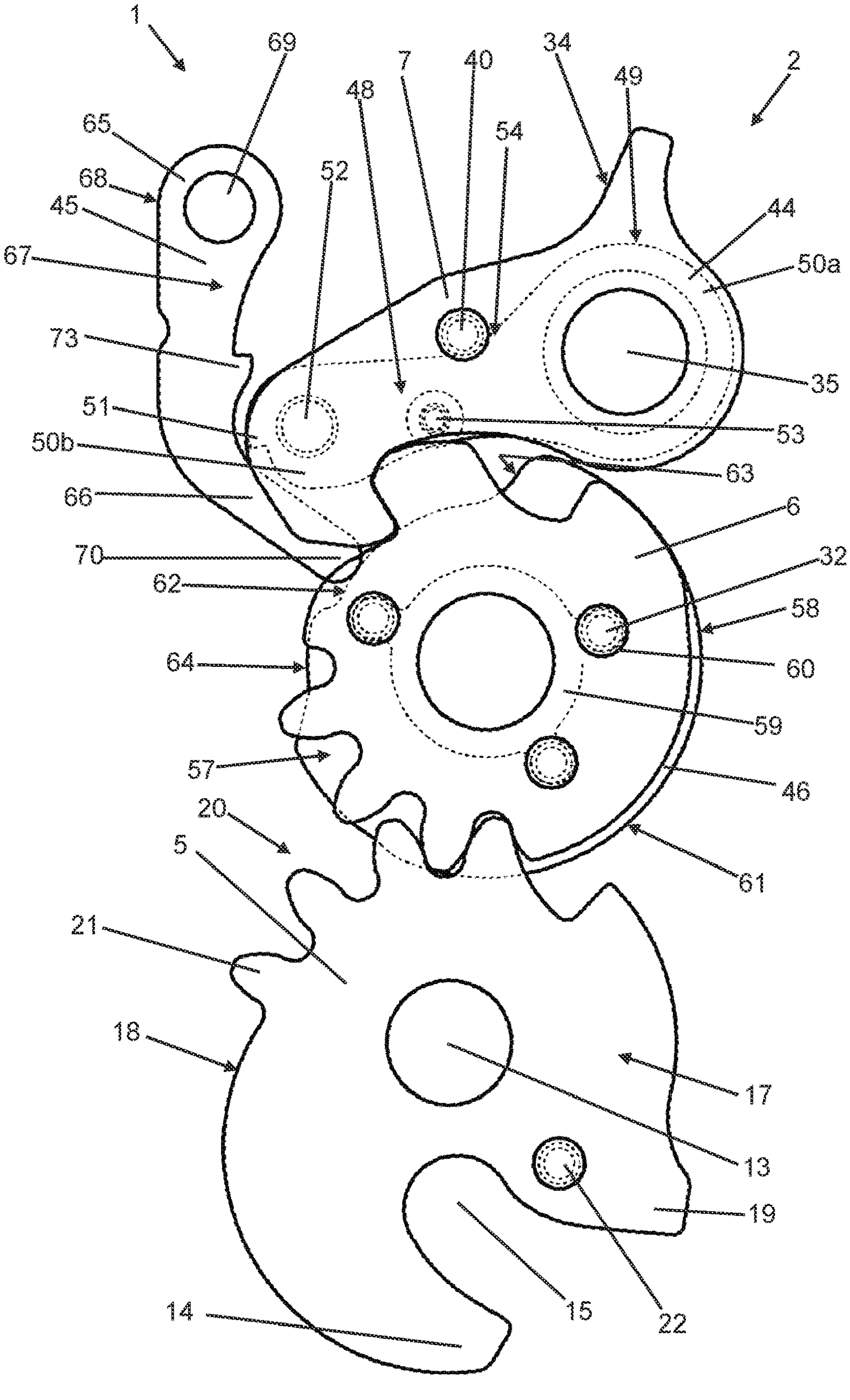
FIG. 10 shows a front-side plan view according to FIG. 8 in the closed position of the vehicle lock.
Figure 11:
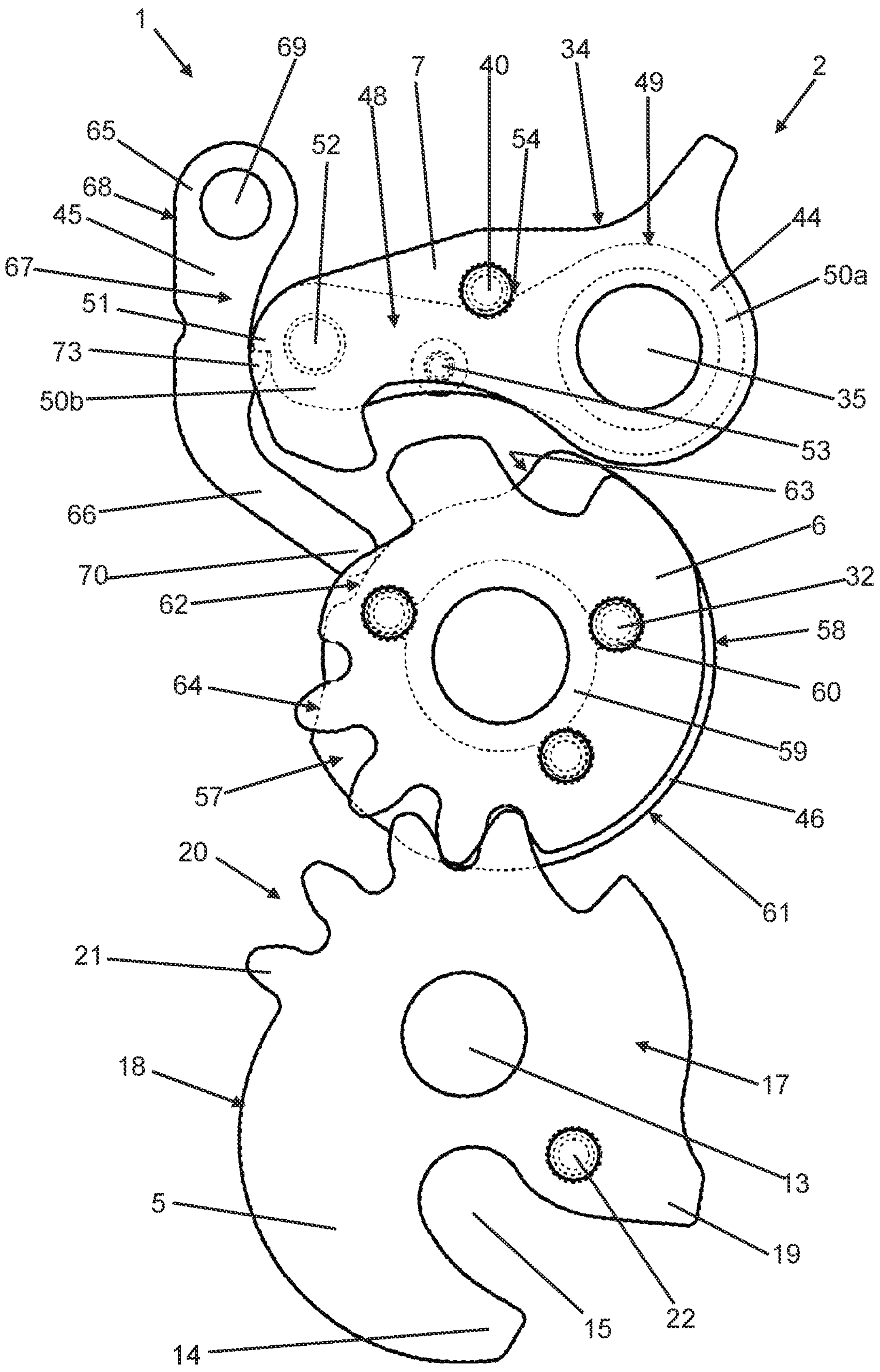
FIG. 11 shows a front-side plan view according to FIG. 8 in the closed position of the vehicle lock, including actuated and locked or retained trigger mechanism.
Figure 12:
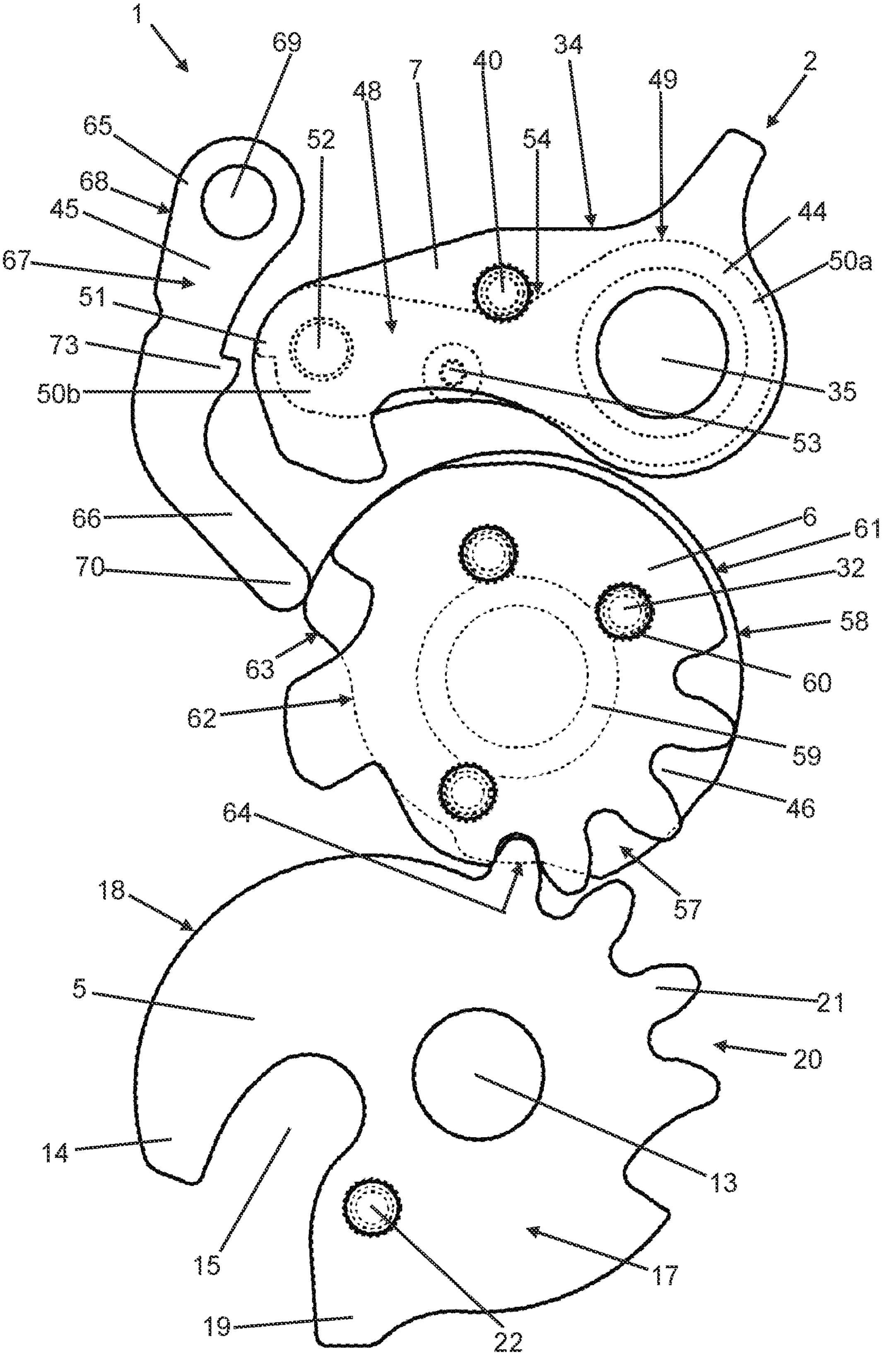
FIG. 12 shows a front-side plan view according to FIG. 8 in the re-opened position of the vehicle lock, including still-actuated, but released, trigger mechanism.

For locking the rotary latch 5, the inventive door lock 1 also includes the locking pawl 7, which holds the rotary latch 5 and the drive wheel 6 in their final latching position (FIGS. 6 and 10) or a pre-latching position (FIGS. 5 and 9) or releases the rotary latch 5 and the drive wheel 6 (FIG. 11).

The, preferably plate-shaped, locking pawl 7 preferably includes two, in particular planar, locking-pawl top sides 33 and a locking-pawl circumferential wall 34. The locking pawl 7 preferably also extends parallel to the cover 9. The locking pawl 7 is also preferably configured elongated and includes a first locking-pawl end 41*a* and a second locking-pawl end 41*b*.

In addition, the locking pawl 7 is disposed parallel to the rotary latch 5 and the drive wheel 6 on the same plane as these.

In addition, the locking pawl 7 is supported at one end, at its first locking-pawl end 41*a*, rotatably about a locking-pawl rotational axis 7*a*, preferably on a locking-pawl supporting bolt 35. The locking-pawl supporting bolt 35 is expediently connected in a fixed manner to the cover 9. The locking pawl 7 is thus connected to the lock case 4, preferably the cover 9, rotatably about the locking-pawl rotational axis 7*a*, and otherwise unrotatably and undisplaceably connected to the lock case 4. The locking-pawl rotational axis 7*a* is spaced from the rotary-latch rotational axis 5*a* and from the drive-wheel rotational axis 6*a*, and preferably parallel to them.

At its second locking-pawl end 41*b*, the locking pawl 7, preferably the locking-pawl circumferential wall 34, includes a locking-pawl detent lug 36. The locking-pawl detent lug 36 points toward the drive wheel 6 and interacts with the drive wheel 6 in a locking manner, which is discussed in more detail below.

In particular in the opened position of the door lock 1 and of the rotary latch 5, the locking-pawl detent lug 36 initially abuts against the drive-wheel circumferential wall 26 outside the two drive-wheel detent recesses 28*a;b*. For this purpose the rotary-latch assembly 2 preferably includes a locking-pawl spring 37, to which the locking pawl 7 is drivably connected, rotatably about the locking-pawl rotational axis 7*a* in a locking-pawl locking direction 38*a*. As a result, the locking-pawl spring 37 drives the locking pawl 7 such that the locking-pawl detent lug 36 is pressed onto the drive wheel 6. The locking-pawl spring 37 is supported at one end on the locking pawl 7, preferably a spring-supporting arm 39, and on the other end on the lock case 4.

The locking pawl 7 also includes a locking-pawl actuating pin 40. The locking-pawl actuating pin 40 is preferably disposed between the two locking-pawl ends 41*a;b* and protrudes from the locking-pawl top side 33 facing the rear wall 8.

Between the two locking-pawl ends 41*a;b*, the locking-pawl circumferential wall 34 also includes a, preferably concave-curved, actuating region 42. The actuating region 42 is facing the drive wheel 6.

The vehicle lock 1 also includes a trigger mechanism 43 for releasing the locking of the rotary latch 5 and of the drive wheel 6.

The trigger mechanism 43 includes a trigger lever 44, a retainer lever 45, and a control disk 46.

In addition, the trigger mechanism 43 is disposed in a different plane than the rotary-latch assembly 2. A support plate 47 is preferably present between the rotary-latch assembly 2 and the trigger mechanism 43. The support plate 47 thus serves for mechanical separating of rotary-latch assembly 2 and trigger mechanism 43.

The trigger lever 44 serves for unlocking of the locking pawl 7 and preferably of a transmission 75. Or using the trigger lever 44, the locking pawl 7 is operable such that the locking of the drive wheel 6 by the locking pawl 7 is released.

The, preferably plate-shaped, trigger lever 44 preferably includes two, in particular planar, trigger-lever top sides 48 and a trigger-lever circumferential wall 49. The trigger lever 44 preferably also extends parallel to the cover 9. The trigger lever 44 is also preferably configured elongated and includes a first trigger-lever end 50*a* and a second trigger-lever end 50*b*.

In addition, on one end, at its first trigger-lever end 50*a*, the trigger lever 44 is rotatably supported on the locking-pawl supporting bolt 35 about a trigger-lever rotational axis 44*a* coaxial to the locking-pawl rotational axis 7*a*. The trigger lever 44 is thus connected to the cover 9 rotatably about the trigger-lever rotational axis 44*a*, and otherwise unrotatably and undisplaceably connected to the cover 9.

At its second trigger-lever end 50*b*, the trigger lever 44, preferably the trigger-lever circumferential wall 49, includes a trigger-lever detent lug 51. The trigger-lever detent lug 51 points toward the retainer lever 45.

The trigger lever 44 also includes a trigger pin 52. The trigger pin 52 is preferably disposed on the second trigger-lever end 50*b* and protrudes from the trigger lever top side 48 facing the rear wall 8. The trigger pin 52 also protrudes out of the lock case 4. It preferably reaches through a slot in the lock case 4, in particular in the rear wall 8. The trigger pin 52 thus represents the connection of the trigger mechanism 43 to an actuating mechanism, for example, a push button or a pull handle or the like, disposed outside the lock case 4.

The trigger lever 44 also includes an unlocking pin 53. The unlocking pin 53 is preferably disposed between the two trigger-lever ends 50*a;b*, and also protrudes from the trigger-lever top side 48 facing the rear wall 8.

Between the two trigger lever ends 50*a;b*, the trigger-lever circumferential wall 49 also includes a, preferably concave-curved, actuating region 54. The actuating region 54 is facing away from the control disk 46. The actuating region 54 also interacts with the locking-pawl actuating pin 40, which is discussed in more detail below.

The control disk 46 preferably includes two, in particular planar, control-disk top sides 57, and a control-disk circumferential wall 58. In addition, the control disk 46 includes a recess 59 passing through centrally from the one to the other control-disk top side 57. Furthermore, the control disk 46 includes three pin-receiving recesses 60. The pin-receiving recesses 60 also protrude through the control disk 46 from the one to the other control-disk top side 57. In addition, they are preferably open toward the central recess 59. The pin-receiving recesses 60 are also disposed adjacent to one another in the circumferential direction of the control disk 46. In addition, the pin-receiving recesses 60 serve for receiving the driving pins 32 of the drive wheel 6. The driving pins 32 of the drive wheel 6 are thus disposed in the pin-receiving recesses 60 in a form-fit manner. The control disk 46 is thereby connected in a torque transmitting manner or unrotatable about the drive-wheel rotational axis **6*a* to the drive wheel 6*or*** are.

In addition, the control-disk circumferential wall 58 includes a first circular-cylindrical circumferential wall section 61 and a second circular-cylindrical circumferential wall section 62. Thereby the first circular-cylindrical circumferential wall section 61 has a greater diameter than the second circular-cylindrical circumferential wall section 62. Thereby the first circular-cylindrical circumferential wall section 61 and the second circular-cylindrical circumferential wall section 62 merge via an edge 63.

In addition, the control-disk circumferential wall 58 includes a stop section 64. Here the edge 63 is disposed at one end of the second circular-cylindrical circumferential wall section 62, and the stop section 64 is disposed on the other end of the second circular-cylindrical circumferential wall section 62. It is disposed in particular between the first and the second circular-cylindrical circumferential wall section 61;62.

The retainer lever 45 includes two retainer-lever arms 65;66 connected to each other at one end. The two retainer-lever arms 65;66 are angled with respect to each other. In addition, the, preferably plate-shaped, retainer lever 45 includes two, in particular planar, retainer-lever top sides 67, and a retainer-lever circumferential wall 68. The retainer lever 45 preferably also extends parallel to the cover 9.

In addition, at a free end of the first retainer-lever arm 65, the retainer lever 45 is rotatably supported about a retainer-lever rotational axis **45*a* on a retainer-lever supporting bolt 69. The retainer-lever supporting bolt 69 is expediently connected in a fixed manner to the cover 9, preferably configured one-piece therewith. The retainer lever 45 is thus connected to the cover 9 rotatably about the retainer-lever rotational axis 45*a*, and otherwise unrotatably and undisplaceably connected to the cover 9. The retainer-lever rotational axis 45*a* is spaced from the other rotational axes 5*a*;6*a*;7*a*;44*a*** and preferably parallel to them.

The free end of the second retainer-lever arm 66 facing away from the first retainer-lever arm 65 also serves as retainer-lever-sensing or -control lug 70. The retainer-lever control lug 70 is preferably configured rounded. The retainer-lever control lug 70 abuts against the control-disk circumferential wall 58.

For this purpose the trigger mechanism 43 includes a retainer-lever spring 71, to which the retainer lever 45 is drivably connected, rotatable about the retainer-lever rotational axis **45*a* in a retainer-lever actuating direction 72. As a result, the retainer-lever spring 71 drives the retainer lever 45 such that the retainer-lever control lug 70 is pressed onto the control-disk circumferential wall 58. The retainer-lever spring 71 is supported at one end on the retainer lever 45, in particular a groove in the retainer-lever circumferential wall 68, and at the other end on the lock case 4**.

Furthermore, the retainer lever 45, preferably the retainer-lever circumferential wall 68, includes a retainer-lever detent lug 73. The retainer-lever detent lug 73 is disposed between the two ends of the retainer lever 45 and points toward the trigger lever 44. The retainer-lever detent lug 73 interacts with the trigger-lever detent lug 51, which is discussed in more detail below.

The closing device 3 of the inventive door lock 1 serves for automatic, self-acting closing of the respective vehicle-door or -hatch when the rotary latch 5 is located in the pre-latching position or safety-latch (FIGS. 5 and 9) in which the door or hatch is not completely closed.

For this purpose the closing device 3 includes a drive device, preferably a drive motor 74, a transmission 75, and a control device 76, in particular a logic box. The control device 76 can be disposed at any location.

The drive motor 74 is preferably an electrical motor. The drive motor 74 includes a drive shaft 77 that is connected to the transmission 75 in a torque transmitting manner. For this purpose the drive shaft 77 has a shape deviating from the circular shape. The otherwise circular-cylindrical drive shaft 77 preferably includes a flattening. The drive motor 74 is preferably completely replaceable.

Viewed from the drive motor 74, the transmission 75 includes a first and a second transmission stage 78-1;78-2. Thereby the two transmission stages 78-1;78-2 each include a planetary transmission 79-1;79-2. The two planetary transmission 79-1;79-2 each include a ring gear 80-1;80-2, a planetary carrier 81-1;81-2, a plurality of, preferably five, planetary gears 82-1;82-2, as well as a sun gear 83-1;83-2.

In addition, the transmission 75 has a transmission central axis **75*a* that is coaxial to the drive-wheel rotational axis 6*a***.

The sun gear 83-1 of the first transmission stage 78-1 is connected to the drive motor 74, preferably to the drive shaft 77, about the transmission central axis **75*a*, such that the sun gear 83-1 and the drive motor 74 rotate together. For this purpose the sun gear 83-1 is preferably configured hollow-cylindrical and attached onto the drive shaft 77 in an form-fit manner. Furthermore, the sun gear 83-1** of course includes an external toothing in a known manner.

The planetary carrier 81-1 of the first transmission stage 78-1 is preferably configured disc-like and includes two planetary-carrier top sides 84-1 as well as an encircling planetary carrier circumferential wall 85-1. The planetary-carrier circumferential wall 85-1 is preferably configured circular-cylindrical. In addition, the planetary carrier 81-1 includes a central recess 86-1 extending through the planetary carrier 81-1 from the one to the other planetary-carrier top side 84-1.

Furthermore, the planetary carrier 81-1 of the first transmission stage 78-1 includes a plurality of, preferably five, bearing pins 87-1, preferably bearing needles. Bearing needles have the advantage that they are very accurately fit. The bearing pins 87-1 serve for rotatable supporting of the planetary gears 82-1. They protrude from the planetary-carrier top side 84-1 facing the drive motor 74. Viewed in a circumferential direction of the planetary carrier 81-1, the bearing pins 87-1 are disposed adjacent to each other. In addition, they are disposed distributed around the planetary-carrier recess 86-1.

In addition, the planetary carrier 81-1 of the first transmission stage 78-1 includes a plurality of, preferably five, carrier grooves 88-1, that extend from the planetary carrier circumferential wall 85-1 into the planetary carrier 81-1. Viewed in the circumferential direction of the planetary carrier 81-1, the carrier grooves 88-1 are disposed adjacent to one another.

In addition, the planetary carrier 81-1 of the first transmission stage 78-1 preferably includes a plurality of, preferably five, grooves 89-1, that extend from the planetary carrier recess 86-1 into the planetary carrier 81-1. Viewed in the circumferential direction of the planetary carrier 81-1, the grooves 89-1 are disposed adjacent to one another. They serve for torque transmission to the sun gear 83-2 of the second transmission stage 78-2. For this purpose the sun gear 83-2 includes radially protruding cams 107-2 on its motor-side end. The cams 107-2 are disposed in the grooves 89-1 of the planetary carrier 81-1 of the first transmission stage 78-1 in a form-fit manner. The sun gear 83-2 of the second transmission stage 78-2 is thereby connected unrotatably about the transmission axis 75*b* to the planetary carrier 81-1 of the first transmission stage 78-1.

The planetary gears 82-1 of the first transmission stage 78-1 are preferably configured hollow-cylindrical. In a known manner they include an external toothing corresponding to the external toothing of the sun gear 83-1. In addition, they are rotatably supported about their respective planetary-gear rotational axes on one of the bearing pins 87-1.

The ring gear 80-1 of the first transmission stage 78-1 includes a ring-gear wall 90-1 including a wall outer surface 91-1, and an internal toothing corresponding to the external toothing of the planetary gears 82-1.

In addition, the ring gear 80-1 of the first transmission stage 78-1 includes a plurality of, preferably three, stop pins 92-1, that protrude from the wall outer surface 91-1. With respect to the transmission central axis 75*a*, they preferably protrude radially from the wall outer surface 91-1. The stop pins 92-1 include a preferably circular-cylindrical outer bearing surface 93-1. In addition, a ramp 94-1 is present adjacent to each of the stop pins 92-1. The ramp 94-1 extends from the wall outer surface 91-1 to the stop pin 92-1 and ends at the height of the outer bearing surface 93-1.

Viewed in the circumferential direction of the ring gear 80-1, opposite the ramp 94-1 the stop pins 92-1 each include a pin-abutment surface 95-1.

In addition, the ring gear 80-1 of the first transmission stage 78-1 is unrotatably connected to the lock case 4 about the transmission central axis 75*a*. The ring gear 80-1 is disposed in particular in a tubular housing connecting piece 55 connecting to the lock case 4 and protruding outward therefrom, and unrotatably connected thereto about the transmission central axis 75*a*. The housing connecting piece 55 is in turn connected in a fixed manner to the lock case 4. Thus, in a known manner, a rotating of the sun gear 83-1 about the transmission central axis 75*a* effects a rotating of the planetary carrier 81-1 about the transmission central axis 75*a*, which is discussed in more detail below.

As explained above, the second transmission stage 78-2 also includes a ring gear 80-2, a planetary carrier 81-2, planetary gears 82-2, and a sun gear 83-2. These are configured and disposed in an essentially analogous manner to the ring gear 80-1, the planetary carrier 81-1, the planetary gears 82-1, and the sun gear 83-1 of the first transmission stage 78-1. That is, in an analogous manner to the foregoing description, the second transmission stage 78-2 comprises two planetary-carrier top sides 84-2, a planetary-carrier circumferential wall 85-2, a planetary carrier recess 86-2, bearing pins 87-2, carrier grooves 88-2, grooves 89-2, a ring-gear wall 90-2 including wall outer surface 91-2, stop pins 92-2, bearing surface 93-2, ramp 94-2, and pin-abutment surface 95-2.

However, as described above, the sun gear 83-2 of the second transmission stage 78-2 is unrotatably connected to the planetary carrier 81-1 of the first transmission stage 78-1 about the transmission central axis 75*a*. It is in particular inserted into it and preferably crimped thereto.

Thereby the sun gear 83-2 of the second transmission stage 78-2 protrudes from the planetary carrier top side 84-1 of the planetary carrier 81-1 of the first transmission stage 78-1, which planetary carrier top side 84-1 faces away from the drive motor 74.

In addition, the planetary carrier 81-2 of the second transmission stage 78-2 is unrotatably connected to the drive wheel 6 about the transmission central axis 75*a*. For this purpose the driving pins 32 of the drive wheel 6 are preferably each disposed in one of the carrier grooves 88-2. The carrier grooves 88-2 thus serve for form-fit receiving of the driving pins 32 of the drive wheel 6, and thus for connection of the drive wheel 6 to the planetary carrier 81-2 of the second transmission stage 78-2 such that the drive wheel 6 and the planetary carrier 81-2 rotate together. Thereby the control disk 46 is disposed between the drive wheel 6 and the planetary carrier 81-2 of the second transmission stage 78-2.

In contrast to the ring gear 80-1, the ring gear 80-2 of the second transmission stage 78-2 is not permanently fixed to the lock case 4, but in a non-locked initial state is freely rotatable relative to the lock case 4 about the transmission central axis 75*a*. In addition, the ring gear 80-2 is also disposed in the housing connecting piece 55.

Both transmission stages 78-1;78-2 are thus disposed inside the housing connecting piece 55, which effects a compact construction. In particular because the housing support piece 55 is connected in a fixed manner to the lock case 4, in particular the rear wall 8. The housing support piece 55 is preferably configured one-piece with the rear wall 8, and preferably also with the transverse and longitudinal walls 10*a;b*. In particular everything is made of plastic.

Figure 23:
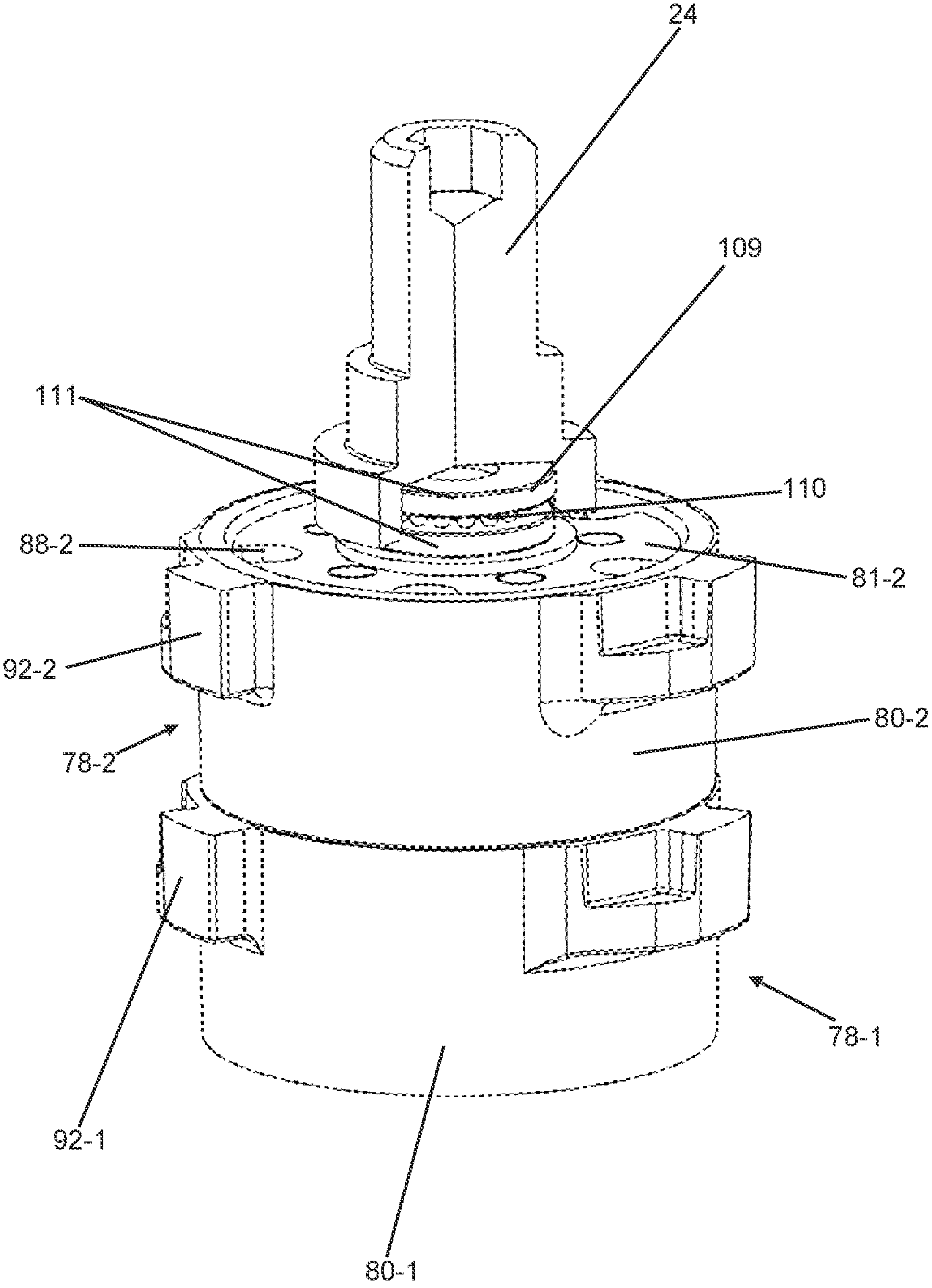
FIG. 23 shows a perspective representation of the two transmission stages including a drive-wheel supporting bolt.

The ring gear 80-2 is connected to the lock case 4 via the planetary gears 82-2 and the planetary carrier 81-2 of the second transmission stage 78-2. For this purpose the other or second bearing housing disk 111 is fixed to the planetary carrier 81-2 (FIG. 23).

Thereby the ring gear 80-2 of the second transmission stage 78-2 is connected to the lock case 4, always freely rotatable in a first transmission rotational direction 96*a*.

Figure 14:
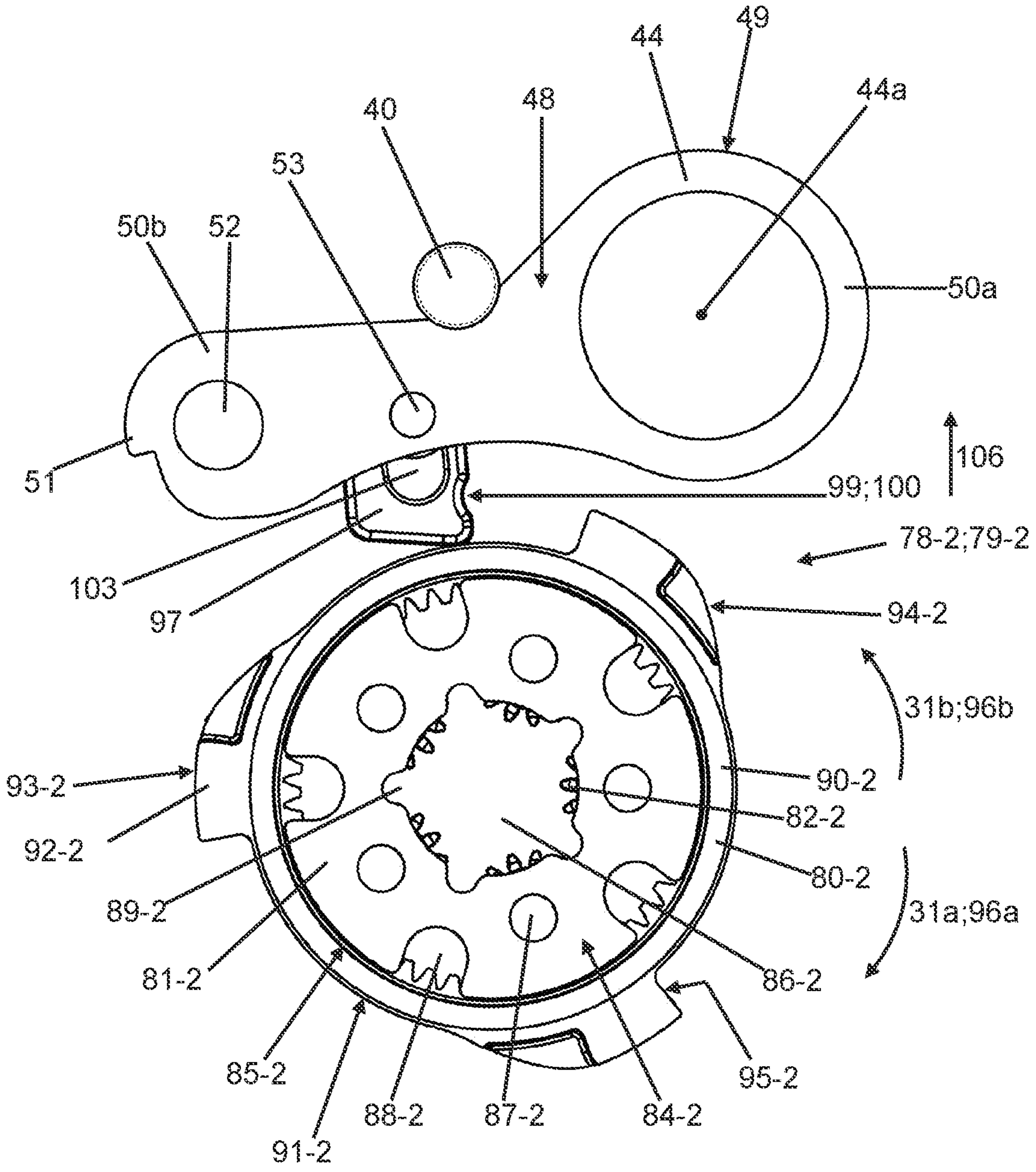
FIG. 14 shows a plan view of a trigger lever, a locking element, and a second transmission stage, before start-up of a drive motor, second ring gear not locked.
Figure 15:
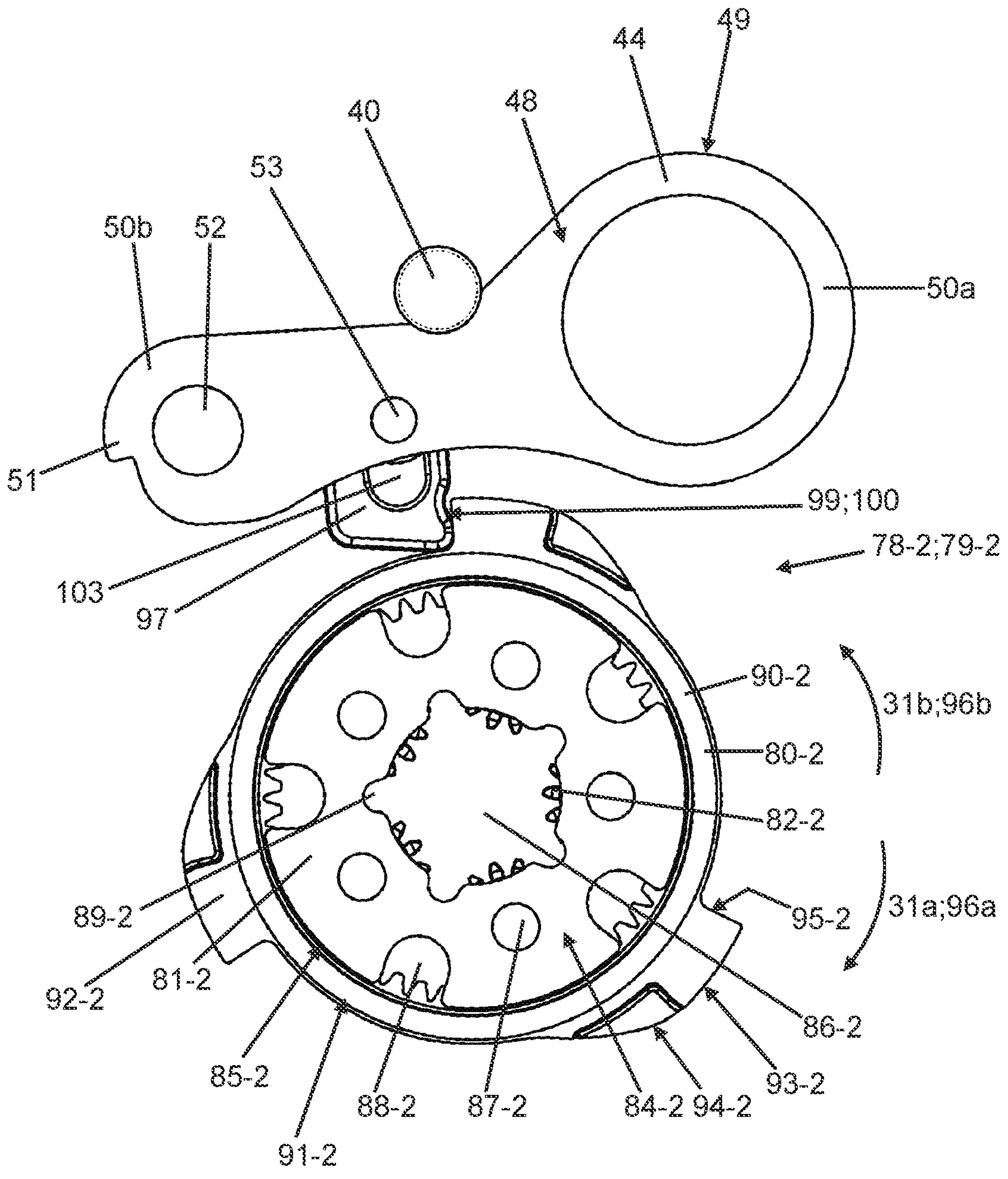
FIG. 15 shows a plan view of a trigger lever, a locking element, and a second transmission stage, after start-up of the drive motor, second ring gear locked for force transmission.
Figure 16:
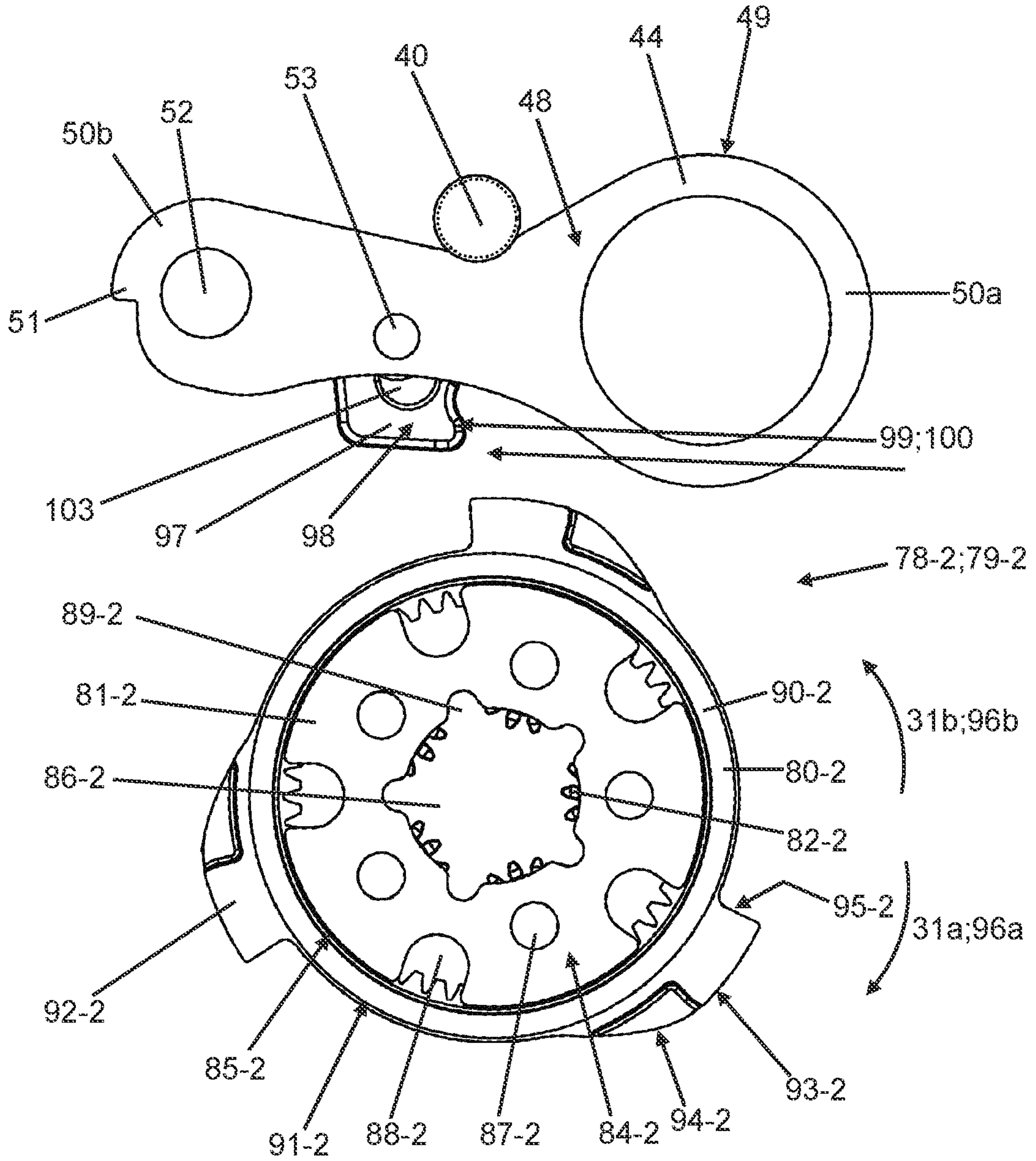
FIG. 16 shows a plan view of a trigger lever, a locking element, and a second transmission stage, second ring gear unlocked.
Figure 17:
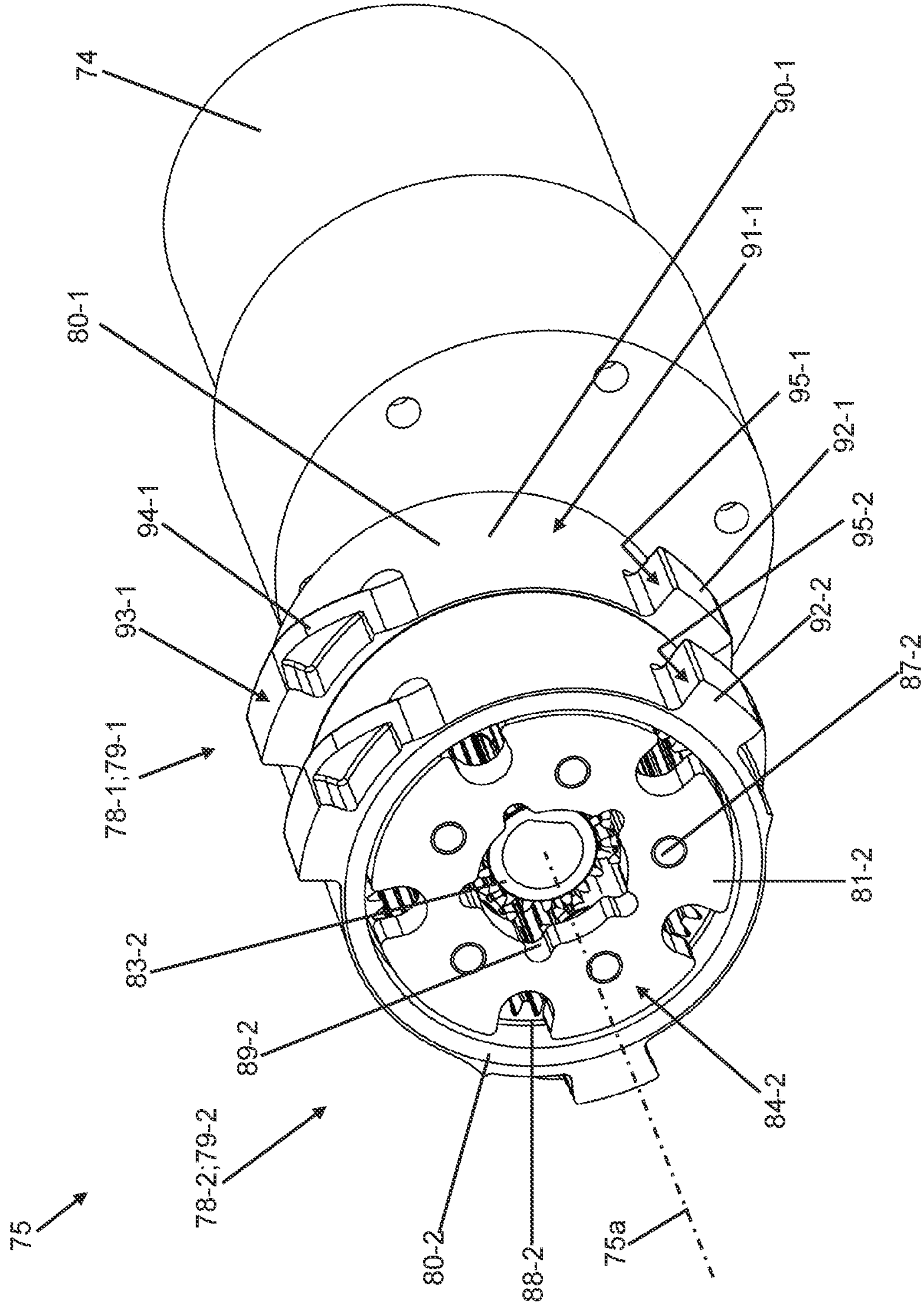
FIG. 17 shows a perspective view of a transmission and the drive motor.
Figure 18:
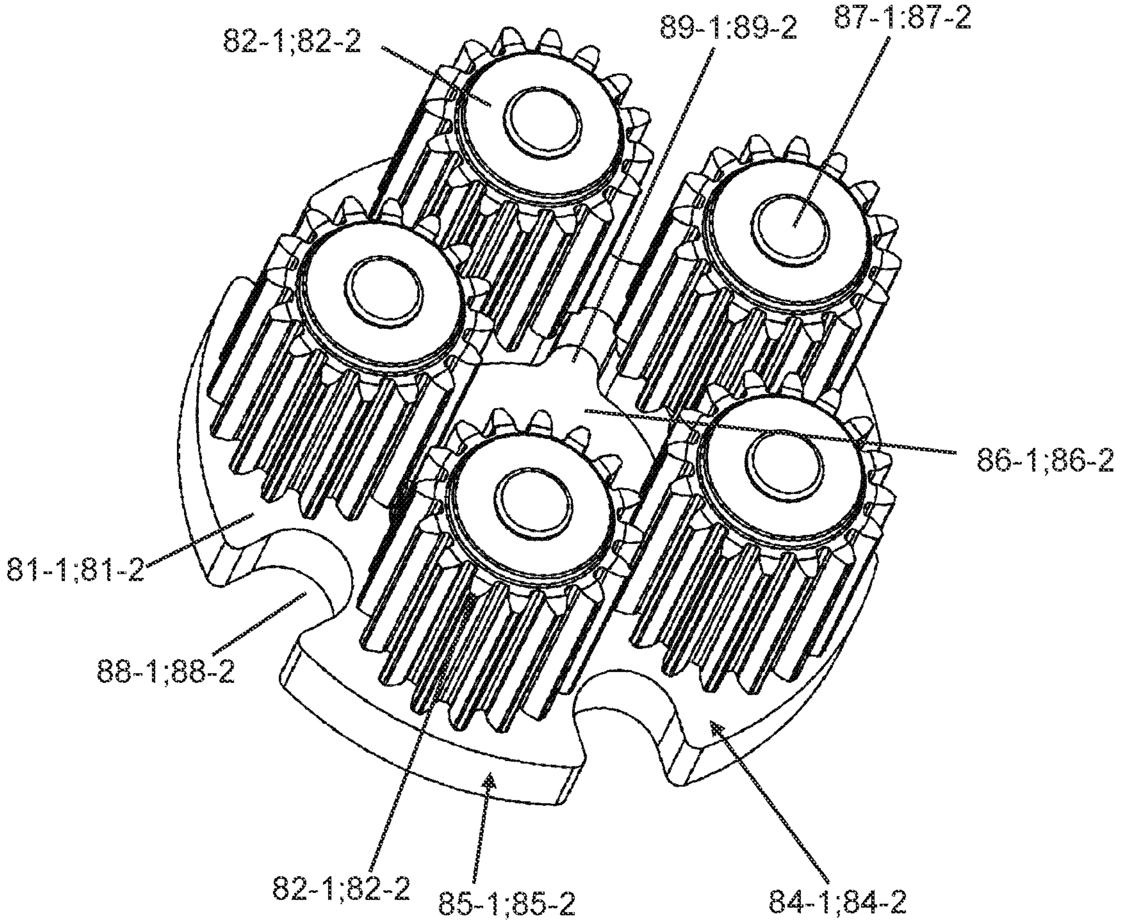
FIG. 18 shows a perspective view of a planetary carrier of the transmission.
Figure 19:
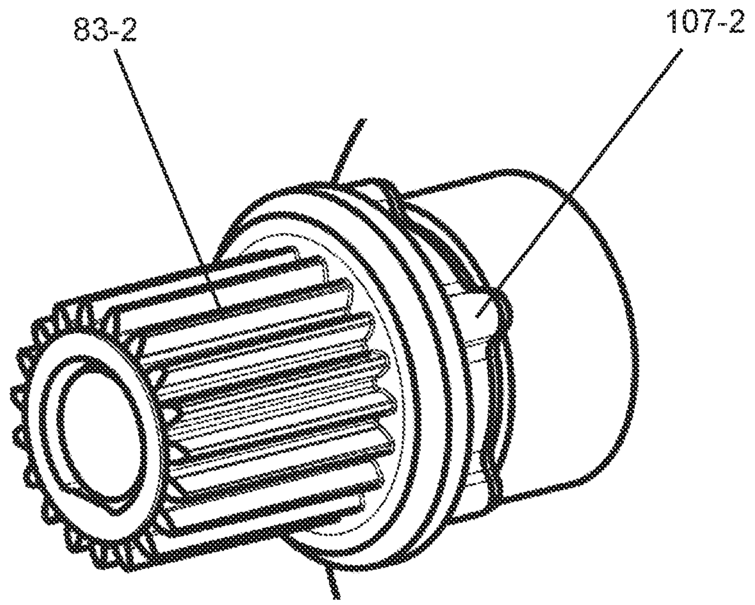
FIG. 19 shows a perspective view of a sun gear of a second transmission stage of the transmission.

However, the rotating of the ring gear 80-2 in a second transmission rotational direction 96*b* opposite the first transmission rotational direction 96*a* is lockable. For this purpose the second transmission stage 78-2 includes a locking element 97 (FIGS. 14-16).

The locking element 97 is preferably configured as an essentially cuboid block and includes two opposing block top sides 98 and an encircling block circumferential wall 99. The block circumferential wall 99 also includes a block-stop surface 100 and a spring-supporting surface 101. The spring-supporting surface 101 serves for supporting a locking-element spring 102. The block-stop surface 100 and the spring-supporting surface 101 merge into each other or connect directly to each other.

Furthermore, the locking element 97 is supported in the lock case 4 such that it is displaceable back and forth in a direction perpendicular to the transmission central axis 75*a*. In particular, the locking element 97 has a position (FIG. 15) locking the second ring gear 80-2, and a position (FIG. 16) releasing the second ring gear 80-2, which is discussed in more detail below. In its locking position the locking element 97 is drivably connected to the locking-element spring 102. Or the locking-element spring 102 urges the locking element 97 into its locking position. Here the locking-element spring 102 is preferably supported at one end on the spring-supporting surface 101, and at the other end on the lock case 4.

In addition, the locking element 97 preferably includes a block-operation recess 103 preferably passing-through from the one to the other block top side 98. The block-operation recess 103 is preferably disposed centrally. It serves for unlocking the locking element 97 via the trigger lever 44. For this purpose the unlocking pin 53 of the trigger lever 44 engages into the block-operation recess 103.

The control device 76 includes two sensors 104;105 and a not-depicted, in particular electronic, control unit.

The sensors 104;105 are preferably touch sensors, preferably microswitches.

Thereby the first sensor 104 interacts with the rotary latch 5, and the second sensor 105 interacts with the locking pawl 7. They serve for detecting the position of the rotary latch 5 or of the locking pawl 7. The sensors 104;105 are preferably each microswitches. These each have a first position wherein the circuit is closed, and a second position wherein the circuit is open. The first sensor 104 is disposed adjacent to the rotary latch 5. The second sensor 105 is disposed adjacent to the locking pawl 7.

In the following the operation of the inventive vehicle-door or -hatch lock 1 shall now be explained:

In an opened position of the vehicle-door or -hatch lock 1 (FIGS. 4, 7, 8, 12, and 13), the locking bolt 12 is located outside the lock case 4 and outside the locking-bolt receptacle 15 of the rotary-latch 5. The locking-bolt receptacle 15 points toward the locking bolt 12. The rotary latch 5 is pressed by the rotary-latch spring 23 into the opened position. Thereby the rotary latch 5 abuts against the lock case 4 such that a further rotating of the rotary latch 5 into a rotary-latch opening direction 16*b* is blocked. The drive wheel 6 is pressed or driven by the rotary latch 5 into its opened position, since the rotary latch 5 and the drive wheel 6 are interlocked via the toothings 20;29.

Furthermore, the locking pawl 7 abuts against the drive-wheel circumferential wall 26 under the pressure of the locking-pawl spring 37 with its locking-pawl detent lug 36. In this position the locking pawl 7 is non-actuated. The locking-pawl actuating pin 40 is spaced from the trigger-lever circumferential wall 49, in particular from the actuating region 54. And the drive wheel 6 is not blocked or locked by the locking pawl 7. The locking pawl 7 is thus in its position not locking or not blocking the drive wheel 6.

The trigger lever 44 is also located in its non-actuated initial position. In this position specifically the unlocking pin 53 of the trigger lever 44 is located in the block-operation recess 103 of the locking element 97, however without actuating it. The trigger lever 44 is also urged into its non-actuated initial position by gravity. In the non-actuated position the lock case 4 in turn serves as a stop.

In the opened position of the vehicle-door or -hatch lock 1, the retainer lever 45 furthermore abuts by its retainer-lever control lug 70 against the first circular-cylindrical circumferential wall section 61 of the control-disk circumferential wall 58 of the control disk 46. The retainer-lever detent lug 73 is spaced from the trigger-lever detent lug 51. Or the detent lugs 51;73 are out of engagement.

The locking element 97 is also located in its non-actuated initial position. In this position, due to the force of the locking-element spring 102, the locking element 97 abuts against the wall outer surface 91 of the ring-gear wall 90-2 of the second ring-gear 80-2. The locking-element spring 102 thus urges the locking element 97 into its non-actuated initial position. In this position a rotating of the second ring-gear 80-2 in the first transmission rotational direction 96*a* is not blocked by the locking element 97. Because the locking element 97 slides along the wall outer surface 91-2 during a rotating of the second ring-gear 80-2 in the first transmission rotational direction 96*a*, until it reaches one of the ramps 94-2. Then it slides along the ramp 94-2, wherein the locking-element spring 102 is compressed. From the ramp 94-2, the locking element 97 slides further onto the bearing surface 93-2 of the stop pin 92-2, and along it until the stop pin 92-2 has passed the locking element 97. Then, driven by the force of the locking-element spring 102, the locking element 97 snaps back into its initial position. The second ring-gear 80-2 is thus freely rotatable in the transmission rotational direction 96*a*.

Furthermore, the two sensors 104;105 are located in their first position. This is registered by the control device 76.

If the door or hatch is closed, then the locking bolt 12 presses against a door-closing direction (arrow 108) against the actuating lug 19 of the rotary latch 5, so that the rotary-latch 5 is pivoted in rotary-latch closing direction 16*a* against the force of the rotary-latch spring 23. The rotary latch 5 in turn drives the drive wheel 6 in its drive-wheel closing direction 31*a* via the rotary-latch toothing 20. Thereby the rotary latch 5 and the drive wheel 6 are pivoted in opposite directions. The rotary latch 5 is also pivoted so far that the latch lug 14 of the rotary latch 5 blocks the locking bolt recess 11 such that the locking bolt can no longer escape from the locking-bolt recess 11 of the lock case 4.

The lock 1 is now only movable by a certain amount relative to the locking bolt 12. This position is referred to as pre-latching position or safety-latch of the lock 1. Although the door or hatch can no longer be opened, it is not yet completely closed.

Due to the rotary movement of the drive wheel 6, the first drive-wheel detent recess 28*a* of the drive wheel 6 also reaches the region of the locking-pawl detent lug 36, which is under spring pressure. Due to the pressure of the locking-pawl spring 37, the locking-pawl detent lug 36 then latches into the first drive-wheel detent recess 28*a*. The drive wheel 6 is thereby blocked or locked in a latching manner. And the rotary latch connected to the drive wheel 6 is also blocked or locked via the drive wheel 6. That is, the rotary latches 5 and the drive wheel 6 can no longer rotate in the rotary-latch opening direction 16*b* or drive-wheel opening direction 31*b* due to the force of the rotary-latch spring 23.

Since the drive wheel 6 and the control disk 46 are connected to each other such that they rotate together, the control disk 46 also rotates with the drive wheel 6 in the drive-wheel closing direction 31*a* when the lock 1 moves from the opened position into the pre-latching position. Here the retainer-lever control lug 70 slides along the control-disk circumferential wall 58 and reaches the region of the edge 63. It abuts there, driven by the force of the retainer-lever spring 71. Thereby the retainer lever 45 rotates against the retainer-lever actuating direction 72 and thus approaches the trigger lever 44. However, the retainer-lever detent lug 73 is still spaced from the trigger-lever detent lug 51.

Since the drive wheel 6 and the control disk 46 are also connected to the second planetary carrier 81-2 such that they rotate together, the second planetary carrier 81-2 also rotates in the drive-wheel closing direction 31*a* when the lock 1 moves from the opened position into the pre-latching position. However, since the second sun gear 83-2 is fixed, the second ring gear 80-2 also rotates simultaneously with respect to the second planetary carrier 81-2, also in the drive-wheel closing direction 31*a* or in the first transmission rotational direction 96*a*, even though at a different speed. In particular, the rotary speed of the second ring gear 80-2 is faster than that of the second planetary carrier 81-2. As explained above, the second ring gear 80-2 can rotate freely here, since it is not locked by the locking element 97.

The second sun gear 83-1 is therefore fixed since the drive motor 74 is not in operation, and thus the first transmission stage 78-1 is blocked. Since the second sun gear 83-1 is connected to the first planetary carrier 81-1 such that they rotate together, it is therefore also blocked or fixed. As is known, this is the behavior of a planetary transmission.

As explained above, during the rotary movement of the second ring-gear 80-2 in the first transmission rotational direction 96*a*, the locking element 97 slides away over the stop pins 92-2 of the second ring-gear 80-2. Thereby the locking element 97 is moved in a locking-element actuating direction 106 in the lock case 4. However, since the block-operation recess 103 is configured elongated or as a slot, the unlocking pin 53 can slide along here in the block-operation recess 103 without the trigger lever 44 being moved.

During the rotating into the pre-latching position, the locking pawl 7 is also rotated so far that the locking-pawl actuating pin 40 of the locking pawl 7 operates the second sensor 105 such that the circuit of the second sensor 105 is interrupted, and the second sensor 105 is located in its second position. The first sensor 104 is still located in its first position. This is the sign that the door lock 1 has taken its pre-latching position.

After a short time delay or activation time, the control unit then triggers the start of the drive motor 74, so that it drives the first sun gear 83-1 in the drive-wheel closing direction 31*a* or a first transmission rotational direction 96*b*. Since the first ring gear 80-1 is fixed in the lock case 4, the first planetary carrier 81-1 rotates simultaneously with the first sun gear 83-1 in the same direction as the first sun gear 83-1, but with a different, in particular lower, rotational speed.

The time delay or activation time is present so that the drive motor 74 is only started if the lock 1 remains in the pre-latching position. If the lock 1 only passes through the pre-latching position and is completely closed directly by the operator, a closing is not necessarily required, and the drive motor 74 need not be started.

Since the second sun gear 83-2 is connected to the first planetary carrier 81-1 in a torque transmitting manner, it rotates together with the first planetary carrier 81-1.

Since, as already explained repeatedly, the second planetary carrier 81-2 is connected to the drive wheel 6 in a torque transmitting manner and the drive wheel 6 is blocked by the locking pawl 7 such that it can no longer rotate in a drive-wheel opening direction 31*b*, the second planetary carrier 81-2 is also not rotatable in the drive-wheel opening direction 31*b* or the second transmission rotational direction 96*b*, or the second planetary carrier 81-2 is blocked or fixed in the drive-wheel opening direction 31*a* or the second transmission rotational direction 96*b*.

The second ring gear 80-2 is thereby driven in the second transmission rotational direction 96*b* by the rotating of the second sun gear 83-2 in the first transmission rotational direction 96*a*. The second ring gear 80-2 and the second sun gear 83-2 thus rotate in opposing transmission rotational directions 96*a;b*.

Here the second ring gear 80-2 can rotate in the second transmission rotational direction 96*b* until one of the stop pins 92-2 strikes or impinges on the locking element 97 (FIG. 15). Starting from this point in time the rotating of the second ring gear 80-2 is blocked in the second transmission rotational direction 96*b* by the locking element 97.

This in turn causes the second planetary carrier 81-2 to now also be driven in the first transmission rotational direction 96*a* by the rotation of the second sun gear axis.

Since the second planetary carrier 81-2 is in turn connected to the drive wheel 6 and the control disk 46 in a torque transmitting manner, the drive wheel 6 and the control disk 46 are rotated together with the planetary carrier 81-2.

The drive wheel 6 drives the rotary latch 5 in the rotary closing direction 16*a* via the toothings 20;29.

The rotary latch 5 is rotated until the locking bolt 12 is disposed in an interference-fit manner in the locking-bolt recess 15 of the rotary latch 5 and the locking-bolt recess 11 of the lock case 4 and is gripped in a fixed manner and in an interference fit manner.

Figure 6:
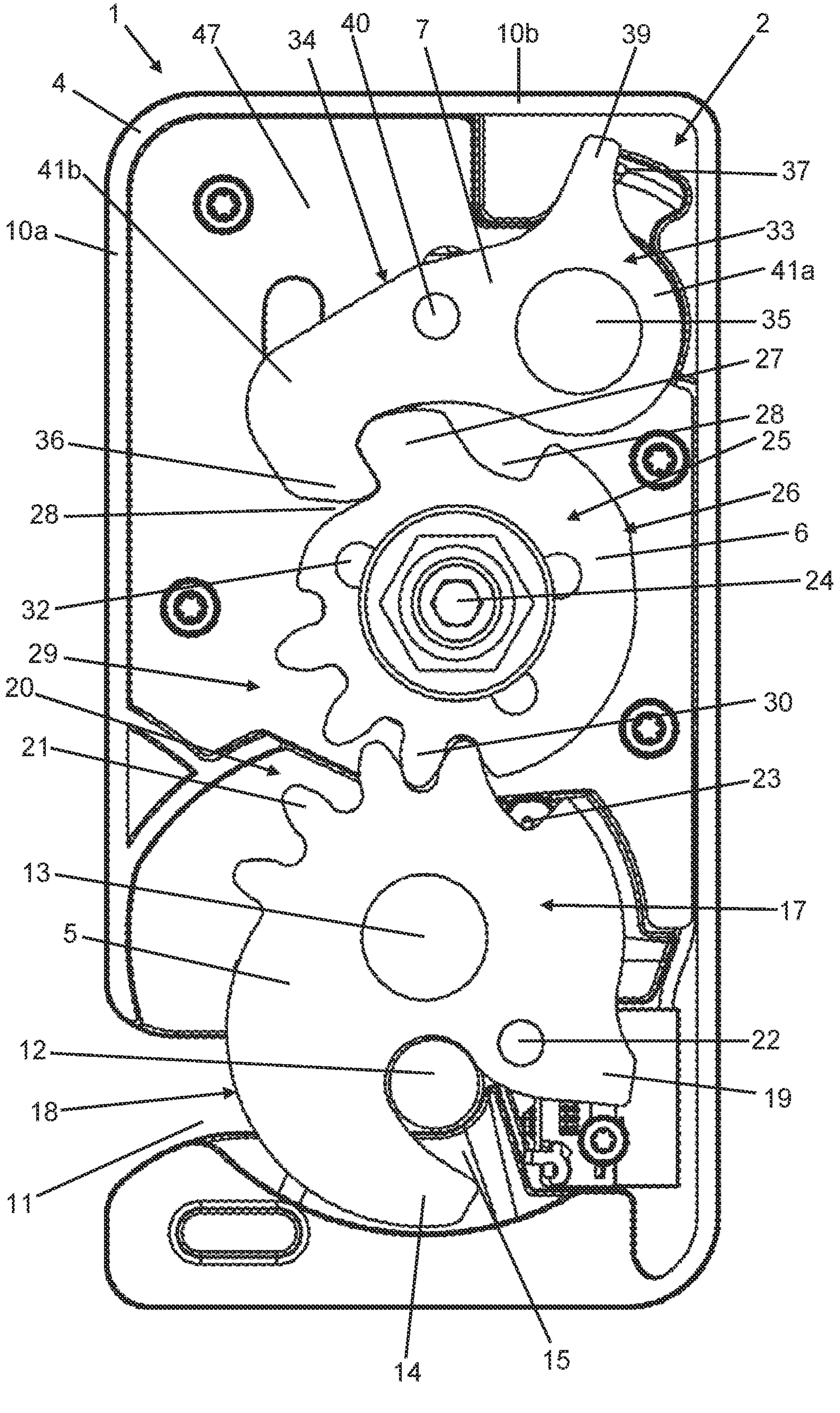
FIG. 6 shows a front-side plan view of the inventive vehicle lock according to FIG. 4 in the completely closed position.
Figure 7:
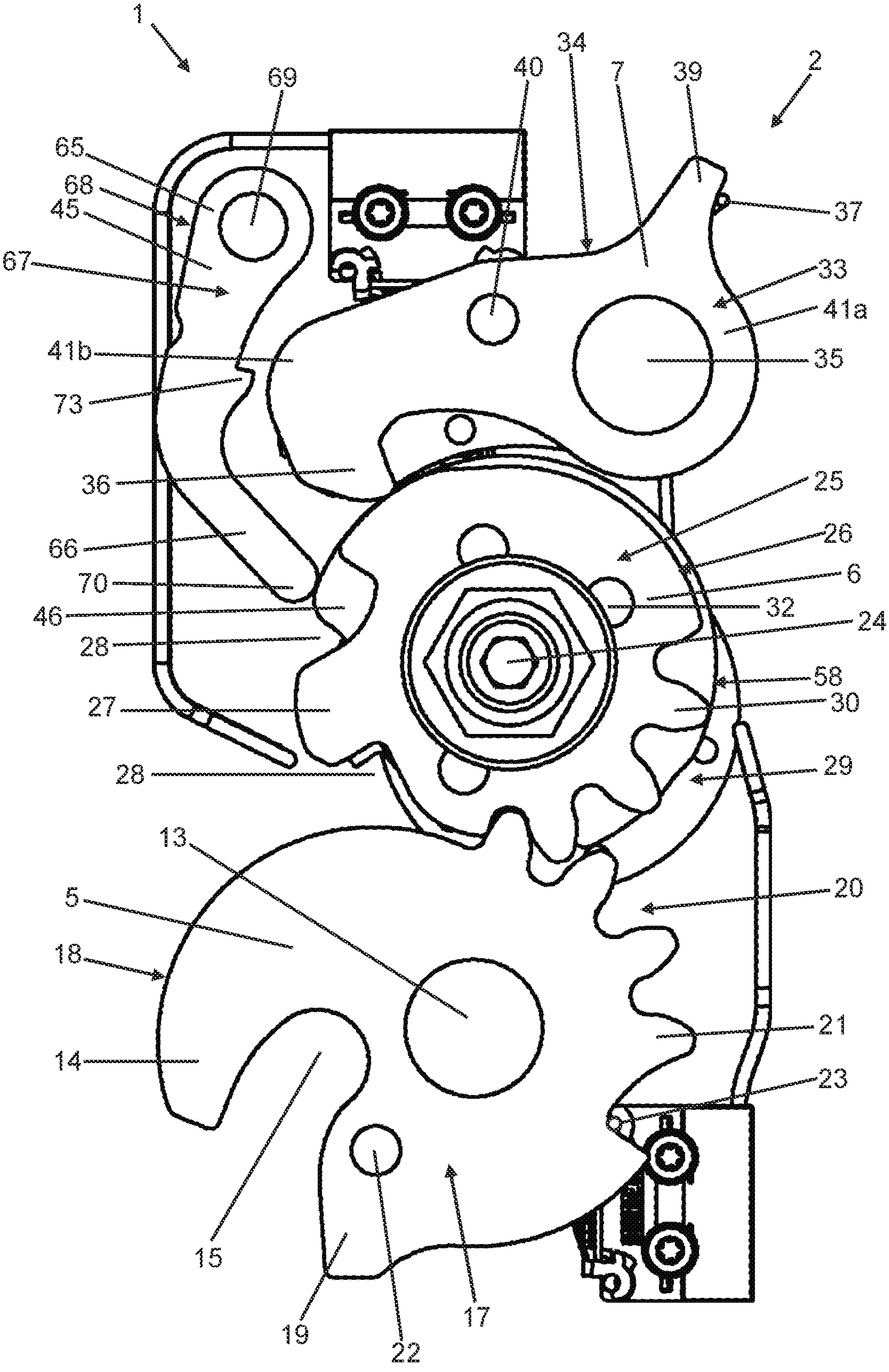
FIG. 7 shows a front-side plan view of the inventive vehicle lock, including two sensors without a lock case, in the opened position of the vehicle lock.
Figure 8:
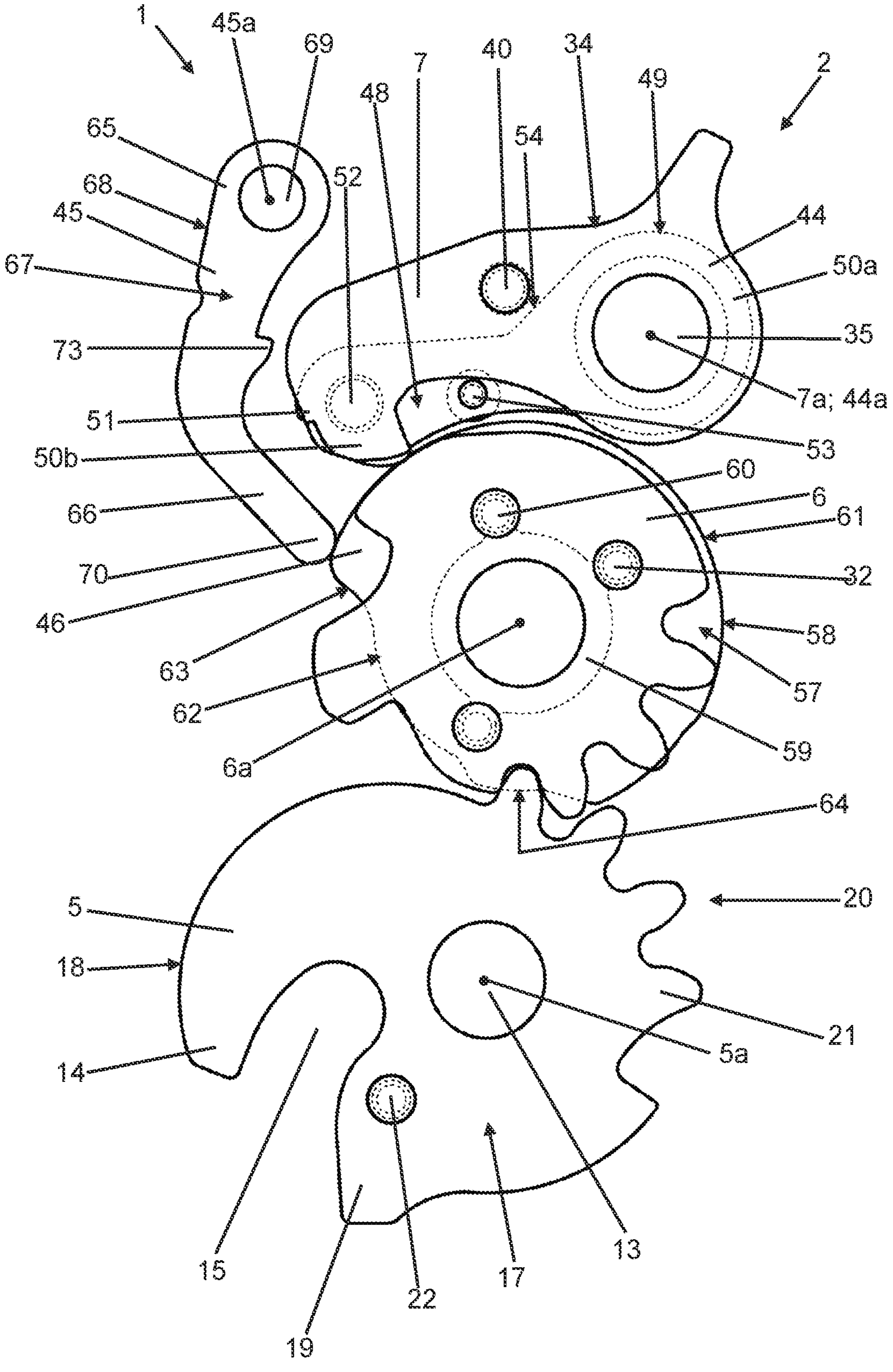
FIG. 8 shows a front-side plan view of a rotary latch mechanism and a trigger mechanism of the inventive vehicle lock in the opened position of the vehicle lock; covered components are depicted dashed.

The rotary latch 5 is now located in its final latching position. And the lock 1 is now located in its completely closed position (FIGS. 6, 10).

Due to the rotary movement of the drive wheel 6, the second drive-wheel detent recess 28*b* of the drive wheel 6 reaches the region of the locking-pawl detent lug 36 under spring pressure. Due to the pressure of the locking-pawl spring 37, the locking-pawl detent lug 36 then latches into the second drive-wheel detent recess 28*b* of the drive wheel 6. The drive wheel 6 is thereby blocked or locked again in the drive-wheel opening direction 31*b*.

Due to the locking of the drive wheel 6, the rotary latch 5, the control disk 46, and the second planetary carrier 81-2 are also correspondingly blocked or locked.

During the rotating into the completely closed position, the rotary latch 5 is also rotated so far that the mandrel 22 of the rotary latch operates the first sensor 104 such that the circuit of the first sensor 104 is interrupted, and the first sensor 104 is located in its second position. The second sensor 105 is also located in the second position. This is the sign that the door lock 1 has assumed its completely closed position.

The control unit 76 then stops the drive motor 74.

The drive motor 74 is preferably also rotated briefly in the opposite direction in order to remove the forces from the transmission 75. In particular, the locking element 97 is thereby removed from the stop pin 92-2.

Figure 20:
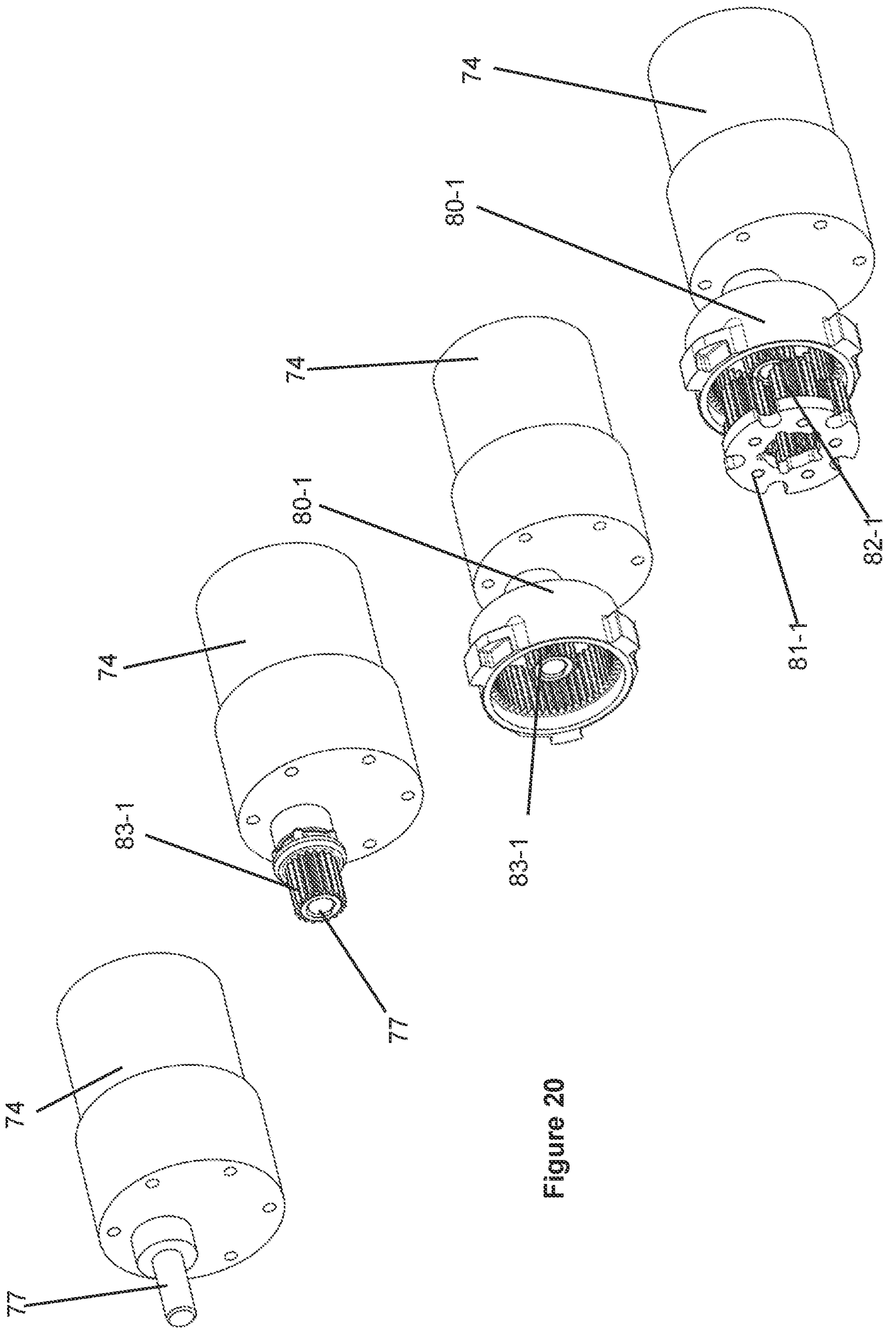
FIG. 20 shows various perspective, partially exploded views of the transmission and of the drive motor.
Figure 21:
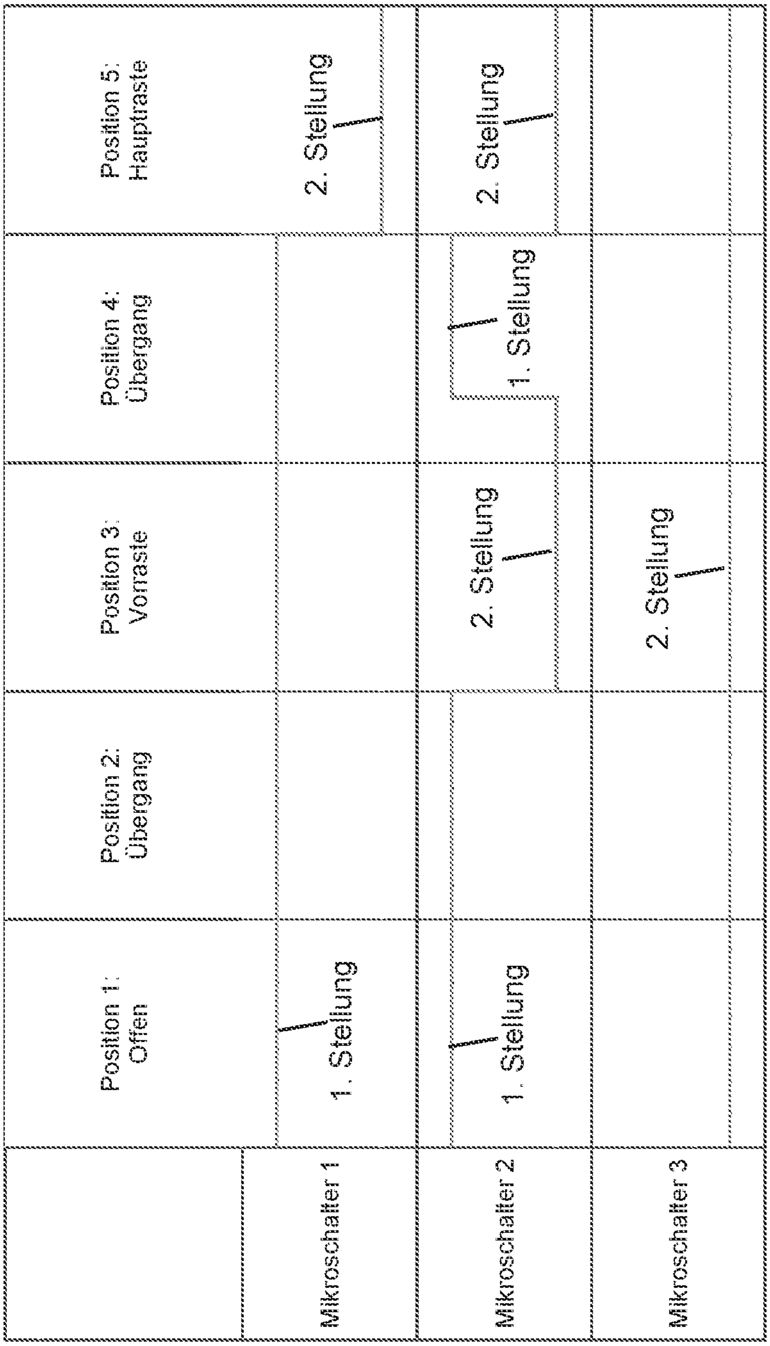
FIG. 21 shows a functional diagram of three micro-switches of the inventive vehicle lock.
Figure 22:
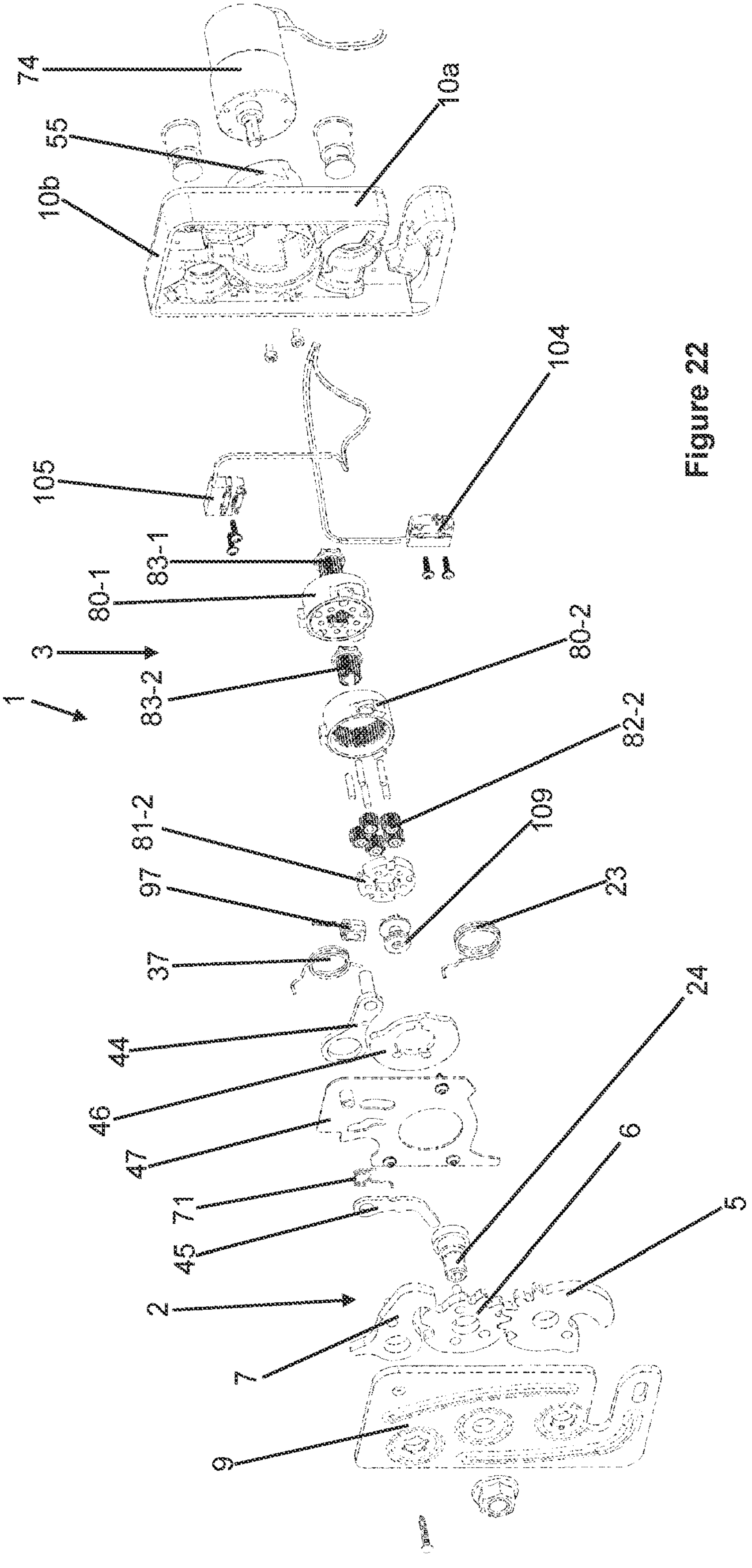
FIG. 22 shows a perspective exploded view of the inventive vehicle lock.

However, during the transition from the pre-latching position into the completely closed position, the second sensor 105 is briefly located in the first position (FIG. 20). The state of the lock 1 is thereby determined, namely that it is located between pre-latching position and final latching position.

For opening the inventive door lock 1 from the pre-latched safety latch (FIGS. 5,7-9) or from the locking position (FIGS. 6,10), i.e., for unlocking the drive wheel 6 and thus also the rotary latch 5, the locking pawl 7 is pivoted in the locking-pawl locking direction 38*b* against the force of the locking-pawl spring 37 (FIG. 11).

For this purpose the trigger lever 44 is pivoted in the trigger-lever unlocking direction 56*a*. As soon as the trigger lever 44 is pivoted so far that the trigger-lever circumferential wall 49, in particular the actuating region 54, abuts against the locking-pawl actuating pin 40, the locking pawl 7 is carried along by the trigger lever 44 and thus actuated.

For actuating the trigger lever 44, for example, a known actuating mechanism, for example, a pull-handle mechanism or a push-button mechanism (not depicted) is used, which engages in the lock case 4 and actuates the trigger lever 44 on the trigger pin 52. Preferably an actuating mechanism is present that can be actuated in a known manner from the vehicle interior, and an actuating mechanism that can be actuated in a known manner from the vehicle exterior.

Figure 4:
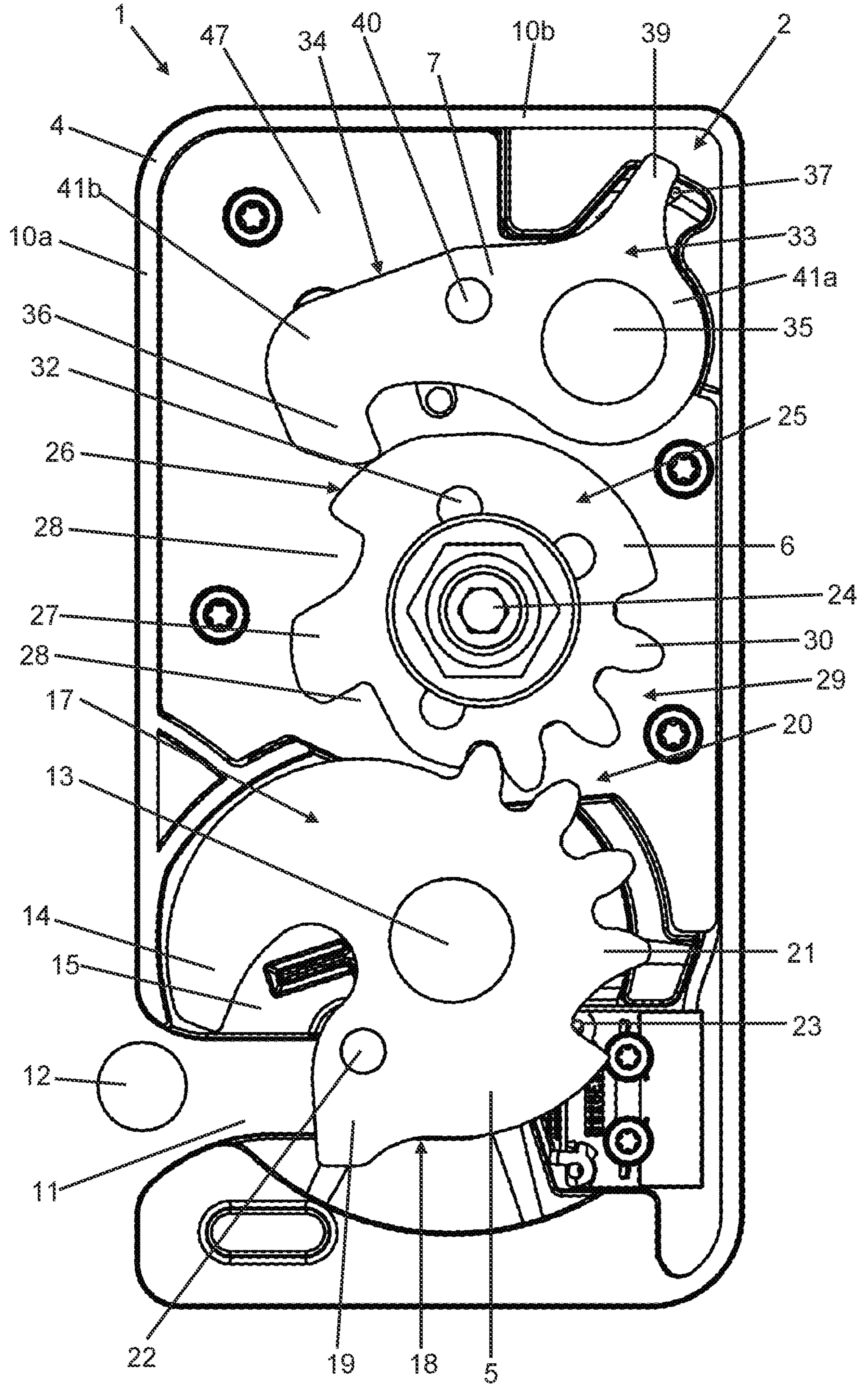
FIG. 4 shows a front-side plan view of the inventive vehicle lock, without a cover wall of a lock case, in the opened position of the vehicle lock, including a support plate disposed in the lock case.
Figure 5:
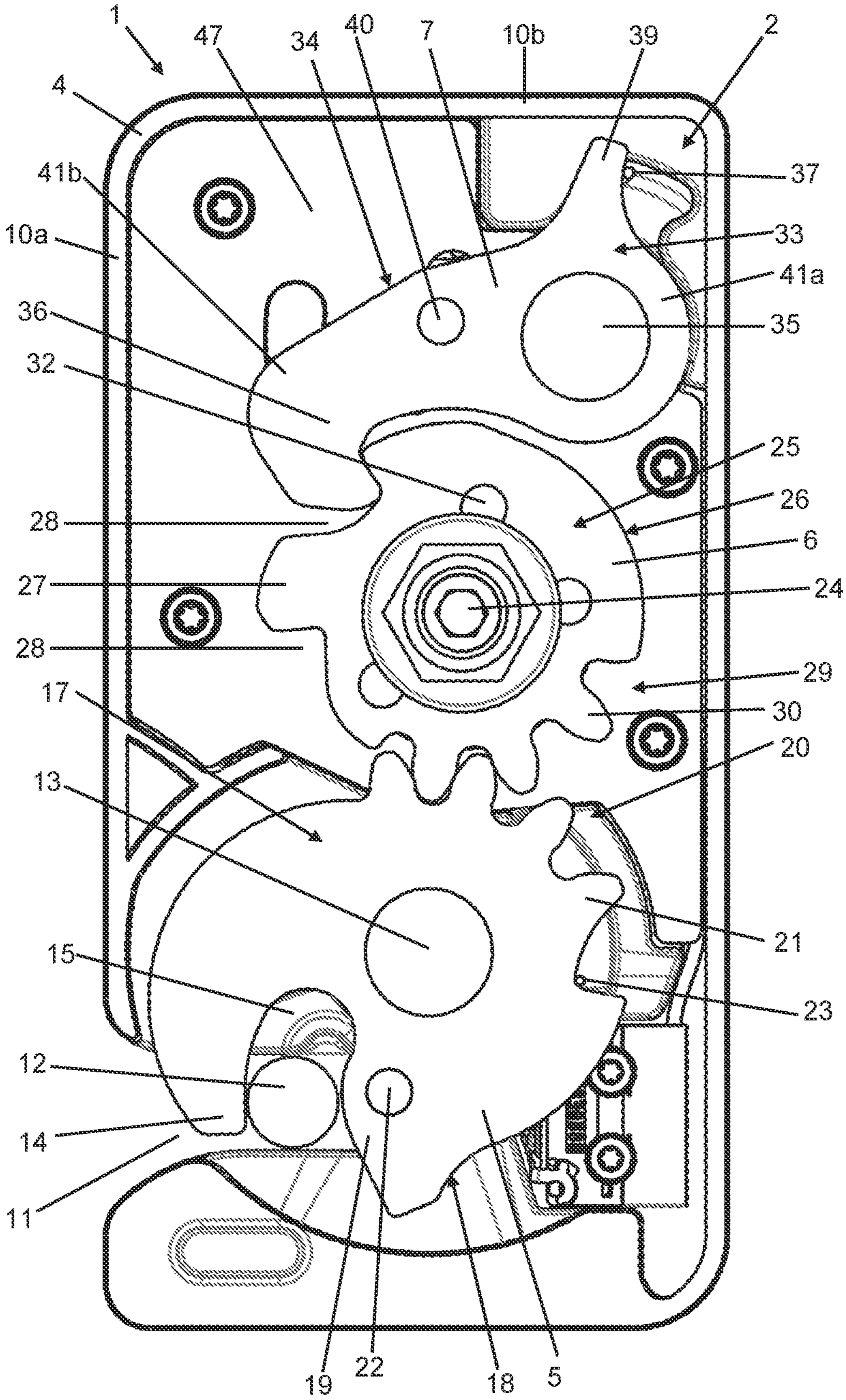
FIG. 5 shows a front-side plan view of the inventive vehicle lock according to FIG. 4 in safety-latching or pre-latching position.

Due to the rotation of the locking pawl 7 in the locking-pawl locking direction 38*b*, the locking-pawl detent lug 36 is moved away from the drive wheel 6, so that the locking-pawl detent lug 36 is moved out of the second drive-wheel detent recess 28*b*. The drive wheel 6 and the rotary latch 5 are thereby unlocked and snap back under the pressure of the rotary latch spring 23 into their opened initial position (FIG. 4). The rotary latch 5 thus rotates automatically or in a self-acting manner in the rotary-latch opening direction 16*b*. Here the rotary latch 5 drives the drive wheel 6 via the toothings 20;29. Here the locking bolt 12 is pressed out of the lock case 4. The door lock 1 is again located in its opened position. After the releasing of the locking pawl 7, driven by the force of the locking-pawl spring 37, that means automatically or in a self-acting manner, it snaps back into its non-actuated initial position.

However, the rotating of the drive wheel 6 and of the rotary latch 5 is only possible if the second planetary carrier 81-2, which is connected in a fixed manner to the drive wheel 6, is also freely rotatable. Since the drive motor 74 is off, the first sun gear 83-1 is fixed. And as long as the second ring gear 80-2 is also locked in the second transmission rotational direction 96*b*, the second planetary carrier 81-2 also cannot rotate in the second transmission rotational direction 96*b*.

Simultaneously with the locking pawl 7, the trigger lever 44 therefore operates the locking element 97. It thus unlocks the transmission 75. Since the unlocking pin 53 of the trigger lever 44 engages in the block-operation recess 103 of the locking element 97, the rotating of the trigger lever 44 in the trigger-lever unlocking direction 56*a* effects a movement of the locking element 97 in the locking-element actuating direction 106 against the force of the locking-element spring 102. Here the locking element 97 is moved in the locking-element actuating direction 106 until it is completely out of the movement path of the stop pin 92-2 of the second ring gear 80-2. The second ring gear 80-2 is thereby unlocked and again freely rotatable in the second transmission rotational direction 96*b*.

However, since the drive motor 74 is off, the second sun gear 83-2 is now fixed again. Both the second ring gear 80-2 and the second planetary carrier 81-2 can thereby rotate simultaneously. Since the second planetary carrier 81-2 is connected to the drive wheel 6 in a torque transmitting manner, together with the drive wheel 6 it snaps back in the second transmission rotational direction 96*b* into its initial position. And the second ring gear 80-2 also rotates back into its initial position.

In order to prevent the locking pawl 7 and the locking element 97 from snapping back into their locking positions before the rotary latch 5 and the drive wheel 6 have returned into their initial positions, the retainer mechanism including the retainer lever 45 is present. Because, during the moving of the trigger lever 44 in the trigger-lever unlocking direction 56*a*, the trigger-lever detent lug 51 passes the retainer-lever detent lug 73. Here the retainer lever 45 is pivoted away from the trigger lever 44 against the force of the retainer-lever spring 71. However, as soon as the trigger-lever detent lug 51 has passed the retainer-lever detent lug 73, the retainer lever 45, driven by the force of the retainer-lever spring 71, snaps back again, so that the two detent lugs 51;73 abut against each other or are latched to each other (FIG. 11). The movement of the trigger lever 44 against the trigger-lever unlocking direction 56*a* is thereby blocked by the retainer lever 45. The retainer-lever detent lug 73 is an abutment for the moving of the trigger-lever 44 against the trigger-lever unlocking direction 56*a*. Since the trigger lever 44 is locked, the locking pawl 7 and the locking element 97 are also locked.

Figure 13:
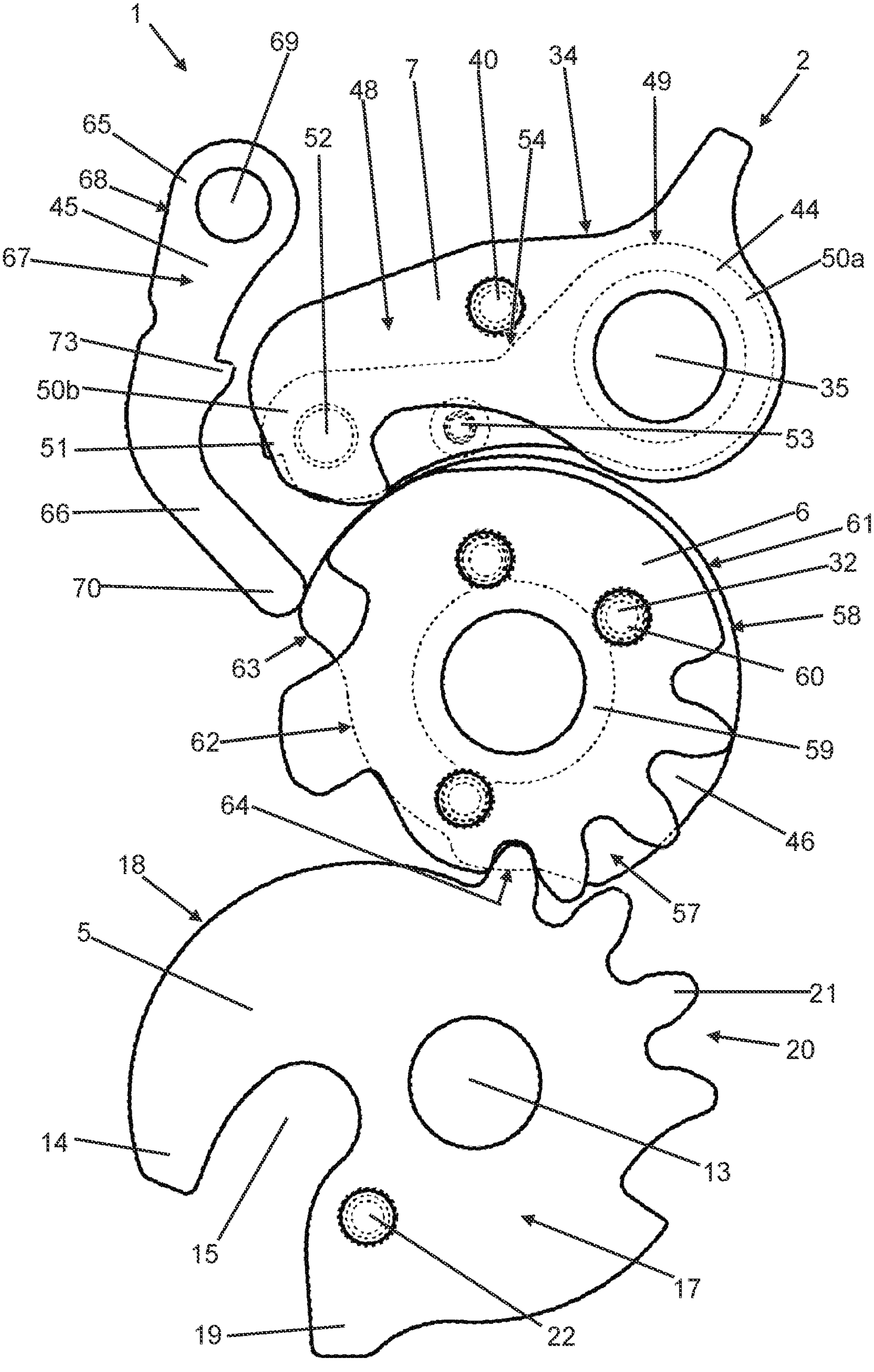
FIG. 13 shows a front-side plan view according to FIG. 8 in the re-opened position of the vehicle lock, including trigger mechanism, again in the initial position.

However, due to the rotation of the drive wheel 6, the control disk 46 connected to the drive wheel 6 in a torque transmitting manner is now also rotated back into its initial position. Here the retainer-lever control lug 70 slides along the second circular-cylindrical circumferential wall section 62 of the control disk 46, and via the edge 63 onto the first circular-cylindrical circumferential wall section 61. The retainer lever 45 is thereby moved away from the trigger lever 44, so that the retainer-lever detent lug 73 releases the trigger-lever detent lug 51. Then the trigger lever 44, driven by the locking pawl 7, snaps back again into its non-actuated initial position. Driven by the force of the locking-pawl spring 37, the locking pawl 7 in turn snaps back into its non-actuated initial position. And driven by the force of the locking-element spring 102, the locking element 97 snaps back into its non-actuated initial position (FIG. 13).

On the one hand the inventive vehicle lock has a high functional reliability. Despite the closing device, the lock is always unlockable manually, since the unlocking of the rotary latch using the trigger lever always also unlocks the second ring gear. After the unlocking, the lock also always automatically returns into its initial position, in particular due to the different springs.

It is also in the context of the invention that the door lock 1 includes a third sensor (not depicted), preferably a third microswitch. The third sensor detects, for example, if something happens during the closing process for which reason the closing process must be interrupted. For example, the third sensor detects when the door lock 1 is unlocked manually from the exterior during the closing process. The control device 76 then detects corresponding information from the third sensor and immediately stops the drive motor.

However, if the door lock 1 is unlocked manually from the exterior during the closing process, as described above the second ring gear 80-2 is also unlocked. The second ring gear 80-2 is thereby freely rotatable again, and force transmission no longer takes place on the drive wheel 6. And the second planetary carrier 81-2 rotates back with the drive wheel 6 in the drive-wheel opening direction 31*b*. Here the drive wheel 6 and the second planetary carrier 81-2 are driven via the rotary latch 5 by the force of the rotary-latch spring 23. The closing process would thus also be interrupted purely mechanically during manual unlocking if the third microswitch is not present or is defective. In addition, it is also preferably provided in terms of control technology that the drive motor 74 rotates only for a certain time period during the closing process and is then switched off in any case. This is an additional safety function.

An advantage of the inventive vehicle lock 1 is in particular also its compact construction. This is realizable inter alia by the two planetary transmissions 79-1;79-2. Because, these reinforce the force of the drive motor 74, so that a very small drive motor 74 having low power can be used. In addition, the transmission 75 is disposed with its transmission axis 75*a* coaxial to the drive-wheel axis 6*a*. It is thus directly connected to the drive wheel 6 without a deflection lever disposed therebetween. A compact construction is also thereby made possible. This is advantageous in particular with agricultural machines, such as, for example, tractors, or construction machines, since significantly less space for the housing of the lock 1 is available in their doors than in automobiles.

Due to the drive wheel 6, it is also possible to again reinforce the force acting from the rotary latch 5 on the locking bolt 12 during the closing process. For this purpose the drive wheel 6 preferably has a greater sprocket diameter than the rotary latch 5.

The force acting on the locking bolt 12 can also be realized simply by a modification of the transmission 75 and of the drive motor 74.

The very compact design of the inventive vehicle lock 1 is advantageous in particular in combine harvesters and similar vehicles. Because, these have a large visible area, so that little space is available for the accommodation of the vehicle lock 1. It is of course also in the context of the invention that the individual components of the two planetary transmissions 79-1;79-2 are not identically configured. For example, the first ring gear 80-1 need not include a stop pin 92-1, since it is supported in a torque transmitting manner. The second planetary carrier 81-2 also needs not have grooves 89-2. And the first planetary carrier 81-1 needs not include any carrier grooves 88-1. And the first sun gear 83-1 does not require the cams. Because, the above-mentioned elements have no function in the respective component. Such elements can thus be omitted. However, the identical design is advantageous in terms of manufacturing.

While the above description constitutes a description of embodiments of the present invention, it will be appreciated that the invention is susceptible to modification, variation and change without departing from the proper scope and fair meaning of the accompanying claims.

The invention claimed is:

1. A vehicle lock for locking doors or hatches of motor vehicles, in particular of the doors or the hatches of agricultural machines including tractors, or of construction machines, comprising a lock case, a rotary latch, rotatably supported in the lock case, for gripping and retaining a locking bolt in a pre-latching position or in a final latching position, a drive wheel rotatably supported in the lock case, interlocked with the rotary latch, a locking pawl, disposed in the lock case, for locking the drive wheel, and via the drive wheel, the rotary latch interlocked with the drive wheel in the pre-latching position or the final latching position, a closing device, to which the rotary latch is drivably connected rotatably in a rotary-latch closing direction from the pre-latching position into the final latching position, wherein the drive wheel is connected directly to the closing device drivably in a drive-wheel closing direction, and a rotation of the drive wheel in the drive-wheel closing direction effects a rotation of the rotary latch in the rotary-latch closing direction, the closing device includes a drive motor and a transmission disposed between the drive motor and the drive wheel, wherein the transmission includes at least first and second transmission stages each including a planetary transmission, and the first and the second planetary transmissions each include a ring gear, a planetary carrier, a plurality of planetary gears, and a sun gear, wherein the ring gear of a first transmission stage is unrotatably connected to the lock case about a transmission central axis.

2. The vehicle lock according to claim 1, wherein the closing device includes a control device for controlling the drive motor.

3. The vehicle lock according to claim 1, wherein after an unlocking of the drive wheel by actuating of the locking pawl, the rotary latch returns automatically, driven by a spring force, from the pre-latching position or the final latching position into an opened initial position.

4. The vehicle lock according to claim 1, wherein the first transmission stage of the first and second transmissions stages is directly connected to the drive motor, and the second transmission stage of the first and second transmissions stages is connected to the drive wheel, the sun gear of the first transmission stage is unrotatably connected to a drive shaft of the drive motor about the transmission central axis, the sun gear of the second transmission stage is unrotatably connected to the planetary carrier of the first transmission stage about the transmission central axis and, the planetary carrier of the second transmission stage is unrotatably connected to the drive wheel about the transmission central axis.

5. The vehicle lock according to claim 4, wherein the vehicle lock includes a locking element for locking the rotating of the ring gear of the second transmission stage in a second transmission rotational direction opposite the drive-wheel closing direction as long as the locking pawl is not actuated.

6. The vehicle lock according to claim 5, wherein the vehicle lock includes a trigger mechanism for releasing the locking of the rotary latch, and for simultaneous suspension of the locking of the ring gear of the second transmission stage.

7. The vehicle lock according to claim 6, wherein the vehicle lock includes a trigger lever for direct actuation of the locking pawl for unlocking the rotary latch, and for simultaneous direct actuation of the locking element for the suspension of the locking of the ring gear of the second transmission stage.

8. The vehicle lock according to claim 6, wherein a trigger lever of the trigger mechanism, is operable using an actuating mechanism disposed outside the lock case.

9. The vehicle lock according to claim 4, the ring gear of the second transmission stage is freely rotatable in the drive-wheel closing direction.

10. The vehicle lock according to claim 9, wherein the planetary carrier of the second transmission stage is connected to a drive-wheel supporting bolt disposed in the lock case freely rotatable in the drive-wheel closing direction on which drive-wheel supporting bolt the drive wheel is rotatably supported.

11. The vehicle lock according to claim 4, wherein the pre-latching position the planetary carrier of the second transmission stage is not rotatable in a drive-wheel opening direction or a second transmission rotational direction.

12. The vehicle lock according to claim 3, wherein the vehicle lock includes a retainer mechanism for automatic retaining of the locking pawl in an actuated position during the returning of the drive wheel and of the rotary latch into the opened initial position.

13. The vehicle lock according to claim 7, wherein after the unlocking of the drive wheel by actuating of the locking pawl, the rotary latch returns automatically driven by a spring force, from the pre-latching position or the final latching position into an opened initial position and the vehicle lock includes a retainer mechanism for automatic retaining of the locking pawl in the actuated position during the rotating-back of the drive wheel and of the rotary latch into the opened position and the retainer mechanism includes a retainer lever, by which the trigger lever is lockable in the actuated position until the rotary latch and the drive wheel have returned into the initial positions.

14. The vehicle lock according to claim 1, wherein a rotary-latch rotational axis, a drive-wheel rotational axis, and a locking-pawl rotational axis are each spaced from each other and are parallel to each other.

15. The vehicle lock according to claim 1, wherein a drive-wheel rotational axis and the transmission central axis are coaxial to each other.

16. The vehicle lock according to claim 1, wherein the rotary latch is connected to a rotary-latch spring so that the rotary latch can be driven in a rotatable manner into the opened position.

17. The vehicle lock according to claim 16, wherein the drive wheel is connected via the rotary-latch to the rotary-latch spring so that the drive wheel can be driven in a rotatable manner in the drive-wheel opening direction about a drive-wheel rotational axis.

18. The vehicle lock according to claim 1, wherein the rotary latch, the drive wheel, and the locking pawl are configured plate-shaped and are disposed parallel to each other and on the same plane.

19. The vehicle lock according to claim 6, wherein the rotary latch, the drive wheel, and the locking pawl are configured plate-shaped and are disposed parallel to each other and on the same plane and the trigger mechanism is disposed in a different plane than the rotary latch, the drive wheel, and the locking pawl, wherein a support plate is present therebetween.

20. The vehicle lock according to claim 2, wherein the control device includes sensors providing information for detecting whether the vehicle lock is located in an opened position, in a pre-latching position, or in a completely closed position, wherein the sensors are connected to the control device.

21. The vehicle lock according to claim 20, wherein using the control device the information of the sensors is detectable, and the drive motor is controllable based on the information.

22. The vehicle lock according to claim 1, wherein the first and second transmission stages are disposed in a tubular housing connecting part connecting to the lock case to a rear wall, and protruding outward therefrom.

23. The vehicle lock according to claim 22, wherein the housing connecting part is configured in one piece with the rear wall, and also with transverse and longitudinal walls of the lock case.

24. A vehicle including a vehicle body and a vehicle-door or hatch, and a vehicle lock, as well as a locking bolt for locking the vehicle-door or -hatch, wherein the vehicle includes the vehicle lock according to claim 1.

25. The vehicle according to claim 24, wherein the lock case is disposed in the vehicle door or hatch, and the locking bolt is connected in a fixed manner to the vehicle body.

26. The vehicle lock according to claim 7, wherein the trigger lever is configured for direct actuation of the locking pawl for unlocking the rotary latch, and for simultaneous direct actuation of the locking element for the suspension of the locking of the ring gear of the second transmission stage.

27. The vehicle lock according to claim 10, wherein the planetary carrier of the second transmission stage is connected to the drive-wheel supporting bolt freely rotatable in the drive-wheel closing direction via an axial deep groove ball bearing.

28. The vehicle lock according to claim 16, wherein the rotary latch is directly connected to the rotary-latch spring so that the rotary latch can be driven in the rotatable manner into the opened position.

29. The vehicle lock according to claim 22, wherein the tubular housing connecting part is connected in a fixed manner to the lock case.

* * * * *